US012630661B2

(12) United States Patent
Burdeniuc et al.

(10) Patent No.: US 12,630,661 B2
(45) Date of Patent: May 19, 2026

(54) ADDITIVES USEFUL IN 3D PRINTING TECHNOLOGIES

(71) Applicant: EVONIK OPERATIONS GMBH, Essen (DE)

(72) Inventors: Juan Jesus Burdeniuc, Colmar, PA (US); Jared Denis Bender, Breinigsville, PA (US); Thomas Dugan, Jr., Allentown, PA (US); Evan Samples, Houston, TX (US)

(73) Assignee: Evonik Operations GmbII, Essen (DE)

( * ) Notice: Subject to any disclaimer, the term of this patent is extended or adjusted under 35 U.S.C. 154(b) by 789 days.

(21) Appl. No.: 17/959,390

(22) Filed: Oct. 4, 2022

(65) Prior Publication Data

US 2023/0120872 A1 Apr. 20, 2023

Related U.S. Application Data

(60) Provisional application No. 63/254,720, filed on Oct. 12, 2021.

(51) Int. Cl.
*C08F 283/00* (2006.01)

(52) U.S. Cl.
CPC ................................ *C08F 283/006* (2013.01)

(58) Field of Classification Search
None
See application file for complete search history.

(56) References Cited

U.S. PATENT DOCUMENTS 9,598,606 B2 3/2017 Rolland et al.
2018/0215854 A1 8/2018 Paranthaman et al.

FOREIGN PATENT DOCUMENTS

WO 2020223058 A1 11/2020
WO 2021133585 A1 7/2021

OTHER PUBLICATIONS

European Search Report for European Application No. EP 22 19 7626 mailed Feb. 10, 2023.

*Primary Examiner* — Sanza L. McClendon
(74) *Attorney, Agent, or Firm* — Andrew H. Chung; Linda S. Li; Jason S. Ngui

(57) ABSTRACT

The present invention relates generally to amine curing agents compositions useful in formulation additives, compositions comprising systems, resin formulations, and the use of these compositions in methods of making objects by additive manufacturing using 3D printing methodologies.

25 Claims, 1 Drawing Sheet

Figure 1: Tensile Strength for Various Curing Agents

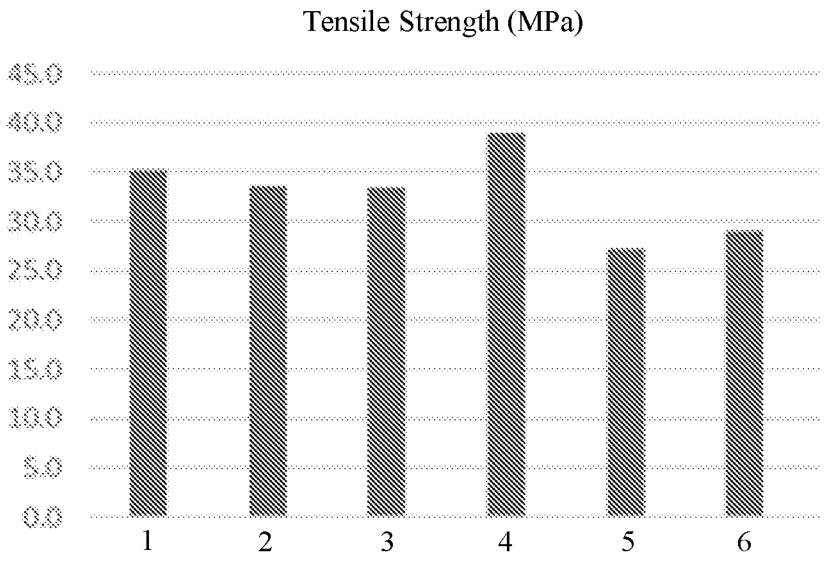

1 = 4,4'-methylene-bis(cyclohexylamine) 2 = 4,4'-methylene-bis(2-methylcyclohexylamine)
3 = Isophoronediamine 4 = 4,4'-methylene-bis(2,6-dimethylcyclohexylamine)
5 = 4,4'-methylene-bis(2,6-diethylcyclohexylamine) 6 = 4,4'-methylene-bis(2,6-diisopropylcyclohexylamine)

Figure 2: Elongation at Break for Various Curing Agents

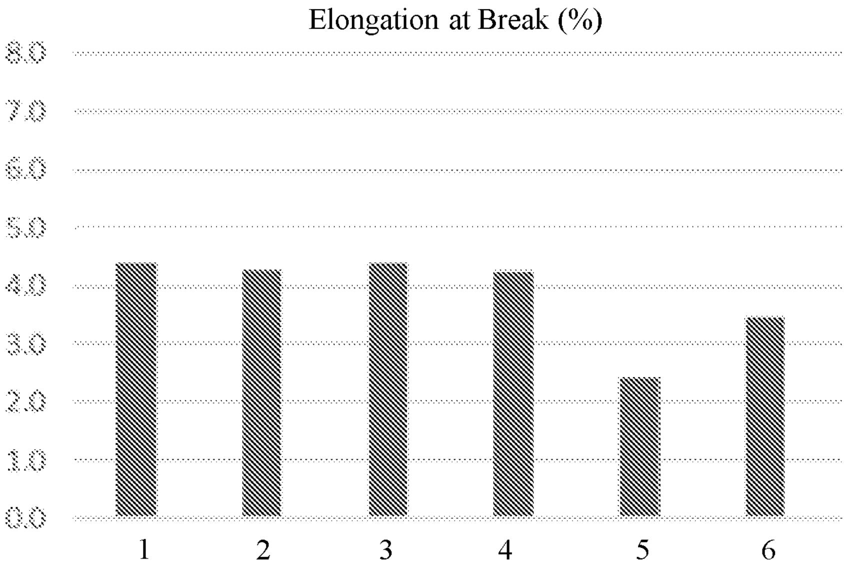

1 = 4,4'-methylene-bis(cyclohexylamine) 2 = 4,4'-methylene-bis(2-methylcyclohexylamine)
3 = Isophoronediamine 4 = 4,4'-methylene-bis(2,6-dimethylcyclohexylamine)
5 = 4,4'-methylene-bis(2,6-diethylcyclohexylamine) 6 = 4,4'-methylene-bis(2,6-diisopropylcyclohexylamine)

ADDITIVES USEFUL IN 3D PRINTING TECHNOLOGIES

This application claims the benefit of Application No. 63/254,720, filed on Oct. 12, 2021, the content of which is hereby incorporated by reference in its entirety into this application.

FIELD OF THE INVENTION

The present invention relates to amine curing agents compositions useful in formulation additives, compositions comprising systems, resin formulations, and the use of these compositions in methods of making objects by additive manufacturing using 3D printing methodologies.

BACKGROUND OF THE INVENTION

"Additive manufacturing" is a general term applied to a manufacturing methodology that consists of making an object by material addition that is joined throughout a 3D frame or working envelope under automated control. The term additive manufacturing refers to this mode of producing objects to differentiate from "subtractive manufacturing" which refers to processes by which 3D objects are constructed by successively cutting material away from a solid block of material as in the case of CNC-machine (computer numerical control) manufacturing. In a typical subtractive manufacturing a computer converts the design provided by a computer aided designed (CAD) software into numbers that represent the coordinates of the graphic design of the object and these numerical controls allow a computer to guide a CNC-machine in the 3D cutting process to generate the object.

In the 3D printing process an object is built from a computer-aided design (CAD) model by successively adding the material layer by layer. The term "3D printing" covers a wide variety of processes in which material is joined by various means using a computer control that guides the printing process according to the shape of the object. Typically the three dimensional shape of the object to be manufactured is converted into coordinates of the object which guides the printing device in forming the object.

Various processes exist for the production of three dimensional objects by additive manufacturing. Different processes might require different types of equipment and materials depending on the physical transformations involved in the 3D printing process. These processes can be classified in the following categories: a) material extrusion; b) powder bed fusion; c) lamination; d) binder jetting; e) directed energy deposition; f) liquid additive manufacturing; g) stereolithography; h) computed axial lithography.

In material extrusion a typical methodology used is called fused filament fabrication or fused deposition modeling that consists of an extrusion of fluid streams of materials or beds that solidifiy and harden forming layers. The materials used are typically thermoplastics that are passed through a heated extrusion nozzle head or printer extruder where the material is heated to its melting point and extruded on the building surface. In this technique or process the nozzle head heats the material and tunes the amount of energy as necessary. The extrusion head is moved by a series of motors through three axes of motion guided from a microcontroller that is linked to a computerized manufacturing software that has the coordinates of the object to be formed. In this mode of additive manufacturing plastics are the most common materials used for manufacturing including high density polyethylene (HDPE), high impact polystyrene (HIPS), polycarbonate (PC), polyurethane (PU), polylactic acid (PLA), acrylonitrile-butadiene-styrene (ABS), polyphenylsulfone (PPSU) and other similar plastics which are typically manufactured in the form of filaments. This method of 3D printing has certain limitations in terms of the shapes that can be produced particularly with fine elongated structures which might not be able to self-support during the printing process unless a special scaffold is built to support them and remove post fabrication.

Powder bed fusion is normally used when building a 3D object by fusing granules of material. In this technique granules of particles are fused to form a layer and then as the printing process moves upwards another layer of granules is deposited and fused in a repetitive manner until the printing process is completed. In a selective sintering process a thermal print-head applies heat to layers of powdered thermoplastic and when a layer that represents a cross-section of the 3D object is completed an automated roller adds a new layer of granulated material which is sintered to form the next cross-section of the object. The energy provided in the sintering process might be provided by a laser source. The laser sintering process of 3D printing can be applicable to materials such as thermoplastics as well as metals. In addition to laser sintering processes other laser methodologies rely on fully melting the granules of material as in the case of selective laser melting. With selective laser melting the materials created are fully dense and they typically have similar mechanical properties to those made by conventional metal manufacturing processes.

Lamination was a method of 3D printing marketed in the 1990s where paper was used as build material. These 3D printers would cut cross-sections of paper coated with adhesives followed by laminating the pieces in layer to generate 3D objects. Other similar printers would cut the different layers of paper and bond them together with adhesive deposition followed by pressure to generate the 3D objects.

Binder jetting is another commonly used 3D printing technique that consists of depositing a binder or adhesive agent on the layers of material typically in a powder. The materials used are typically metal or ceramic. As in other 3D printing processes the object is formed by depositing one layer of material and one layer of binder typically applied using an inkjet type of process. The strength of the object can be further improved using a thermoset impregnated polymer that can increase the crosslinking density of the polymer binder.

Metal 3D printing is normally performed using direct energy deposition in which the metal is fed either as a wire or powder. In the case of wire-fed direct energy deposition, a wire is fed through a nozzle that is melted by the energy provided by a laser using inert gas shielding during the process to prevent air oxidation or alternatively carrying the 3D printing process in an inert-gas sealed chamber. Alternatively, an electron beam can be used if the sealed chamber is a vacuum chamber. In powder-fed directed energy deposition a high energy laser is used to melt the metal powder. A digital model of the part to be fabricated is provided to a software program that guides a laser head through a table which moves upward as the different cross-sections of the 3D object are formed. The process is typically carried out in a sealed chamber filled with an inert gas to prevent air oxidation of the metal. This process is normally used with various metals including titanium, stainless steel, aluminium, etc.

Liquid additive manufacturing is a method in which a fluid like or liquid or a very viscous material is placed on a building surface to create an object which is then cured or hardened by a vulcanization process using heat.

Stereolithography is a 3D manufacturing technique based on photopolymerization of liquid materials into solids. In this process a light transparent container with a liquid polymerizable material is exposed to light from a laser source or a digital light projector which causes the liquid to harden by virtue of the chemical bonds being formed. The liquid component normally contains polymerizable substances such as acrylate moieties able to form linear and branch polymers when exposed to light leading to the formation of solid materials. In this process a light emissing device or digital light projector selectively illuminates a transparent bottom of a tank that contains a liquid polymerizable resin and as the resin is solidified by the polymerization process the solid material is moved upwards leaving a thin gap that is filled by more material which is further polymerized by the light emitting source. As the solid in-print material moves upwards the software adjusts the area of illumination as to continuously build the different cross-sections of the object.

Other photopolymerization printing processes are based on spraying the photopolymer material on a building tray in ultra-thin layers until the object is completed. Each layer is cured with UV light after it is jetted. Inkjet printing systems are used in the production of ophthalmic corrective lenses by printing layer by layer the material using UV photocuring techniques until the lense is completed. Photopolymerization reactions are also used in 3D microfabrication using multiphoton photopolymerization. This approach uses a focused laser to trace the desired 3D object into a block of gel. Curing takes place only where the laser is focused and the remaining of the gel is removed by washing. Resins can also be solidified by projecting light from an LED source. In mask image-projection-stereolithography a 3D digital object is sliced by a set of horizontal planes and each slice corresponds to a 2D image that is projected from the light source to cure the resin according to the 2D image. The light is projected from below allowing the resin to quickly spread into uniform layers reducing the production time.

Continuous liquid interphase production (CLIP) is another form of additive manufacturing method that uses digital light processing (DLP) based photopolymerization to create smooth solid objects. The CLIP process uses a pool of liquid photopolymer resin. The process is typically run using a pool of material the bottom of which is a UV-light transparent window. Like in conventional DLP lithography the UV source shines light through the window illuminating the corresponding cross-section of the object which causes the resin to solidify. As the resins solidify and the object is formed a mechanism slowly rises the object allowing additional liquid resin to fill the gap between the window and the bottom of the object. The CLIP process is characterized by having an oxygen permeable membrane below the bottom of the resin pool creating an oxygen-rich zone in which photopolymerization is inhibited but this inhibition is only effective in that zone preventing the object to stick to the window.

Computed axial lithography (CAL) is a relatively new methodology for 3D printing that differs from other 3D printing technologies in that it does not build a model through the deposition of layers of materials like in fuse deposition or stereolithography. Instead, it creates the images by projecting series of 2D images on a cylinder of resin. Computed axial lithography allows the formation of complex 3D objects as a single operation with no substrates, no support structures and no mechanical devices to remove the object from the resin pool. Instead, the 3D object is created by the superimposition of patterns of light projected on a cylinder of photosensitive resin. The basic principles of CAL require three key elements: a) the optical fields must have a pattern consistent with having the peak intensity of all light sources at all the locations that need to be cured; b) beams lateral intensity profile must be tuned to compensate for the limited resolution of the other beams axial resolution; c) polymerization-inhibitor concentration (typically oxygen) must be consumed to provide the minimum threshold of polymerizable species required for the polymerization process to take place. One of the critical parameters for the production of 3D objects using CAL technology consists of the time of exposure of the resin to the beams of light. The first solidification takes place in the region of the highest intensity where the three beams intersect and the time to reach solidification in this region (which is assumed to be approximately 30% conversion of the chemical unsaturation) is normally called the three beam curing threshold $t_3$. If the resin is exposed for a period longer than $t_3$ then the regions exposed to two beams will start to solidify ($t_2$). Eventually as exposure continues then the single beam illuminated regions also solidify. Thus, it is critical that exposing the resin to a time window between $t_3$ and $t_2$ provides a useful process window for optimizing the 3D structure. Typically, the optimal cure time is defined as the time just before the two beam thresholds ($t_2$) but that will be dependent on the type of resin and the characteristics of the manufacturing process.

U.S. Pat. No. 4,575,330 describes a method and apparatus for making solid objects by successively printing thin layers of a curable material such as a UV-light photopolymer curable material, one on top of the other. A mobile beam of UV light controlled by a computer program shining on a surface or layer of UV curable liquid is used to form a solid cross-section of the object at the surface of the liquid. The object is then moved away from the liquid surface by the thickness of one layer, and the next cross section is then formed and adhered to the immediately preceding layer defining the object. This process is continued until the entire object is formed. This technique is known as stereolithography. The liquid polymerizable substances typically have acrylate moieties able to form linear and branch polymers when exposed to light leading to the formation of solid materials. The light emitting device is typically a digital light projector that selectively illuminates a transparent bottom of a tank that contains a liquid polymerizable resin and as the resin is solidified by the polymerization process the solid material is moved upwards leaving a thin gap that is filled by more material which is further polymerized by the light emitting source. As the solid in-print material moves upwards the software adjusts the area of illumination as to continuously build the different cross-sections of the object. The physical and mechanical properties of the 3D objects made by this technique are inferior to the quality of objects made by dual polymerization processes which typically required the presence of amine curatives.

U.S. Pat. No. 5,236,637 describes two methodologies for the stepwise or layer-by-layer techniques which are typically used. One method in which new layers are formed at the top surface of the growing object and another method in which new layers are formed at the bottom surface of the growing object. In the first case, new layers are formed at the top surface of the growing object, then after each irradiation step the object under construction is lowered into the resin "pool and a new layer of resin is coated on top, and a new irradiation step takes place. The process continues in that sequence until the object is completed. A requirement of such "top down" techniques is the need to submerge the growing object in a pool of liquid resin and reconstitute a precise overlayer of liquid resin on top. This method requires that after each irradiation step the object under construction must be removed from the bottom plate in the fabrication well, a process that involves time and requires care to prevent damage or imperfections on each layer. For the second case, the need for a deep well in which the object is submerged is removed by instead lifting the object from a relatively shallow pool of resin. However, in this case extra care must be taken because it requires after each irradiation a separation of the solidified layer from the bottom plate and depending on physicochemical interaction between the surfaces this could potentially compromise the appearance and quality of the finished product. In this methodology the physical form of the object is dictated by a photopolymerization process guided by UV-light and the final physical and mechanical properties of the materials are determined by the extent and efficiency of UV-light induced covalent bonds and crosslinking density. In general, this methodology lacks the presence of a double polymer network normally present in newer 3D printing methodologies typically induced by thermal curing processes involving amine curative and blocked isocyanates. Thus, the physical and mechanical properties of the 3D objects made by solely induced UV-light are inferior to the quality of objects made by dual polymerization processes which typically required the presence of amine curatives.

U.S. Pat. No. 9,598,606 describes a method for additive-manufacturing where the limitations of traditional processes are overcome by continuously producing an object from a liquid interface. This method is known as "continuous liquid interface production" or "continuous liquid interphase printing" (CLIP™). In this method an object is produced continuously from a pool of liquid polymerizable resin. The bottom of the pool is transparent to UV light and an emitting source shines through the window illuminating the precise cross-section of the object which cause the resin to polymerize. The object being created is slowly and constantly being pulled up from the pool allowing fresh liquid to get in contact with the polymerized surface on which further polymerization occurs guided by the UV light that follows the cross section of the object being formed. Below the bottom of the resin there is a semi-permeable membrane (also called the "dead zone") that allows oxygen to permeate inhibiting the polymerization of the resin right on the surface preventing the formation of a polymer surface on the window. The UV-polymerizable resin described in this process is typically a diisocyanate that has been blocked with an amine of an acrylic acid such as methacrylic acid which upon light induced polymerization it undergoes a second step polymerization which can be induced by microwave radiation or heat and leads to the formation of a secondary polyurea network that provides improvement to the physical properties of the manufactured object. Typically, the amine used include PACM (4,4'-diaminodicyclohexylmethane, commercially available from Evonik Corporation), hydroquinone bis(2-hydroxyethyl) ether (HQEE), 4.4-Methylenebis(3-Chloro 2,6-Diethylaniline) (MCDEA), 4,4'-methylene-bis-(2,6 diethylaniline) (MDEA), 4.4-Methylenebis(2-chloroaniline) (MOCA) are the preferred chain extenders. PACM is characterized by providing good physical properties on cured materials but the blocked-isocyanate resin typically slowly reacts with the blocked isocyanate leading to increased viscosity over time and unacceptable resin shelf life due to pre-mature reaction. On the other hand, aromatic amines such as MCDEA, MDEA and MOCA are too slow to react with the resin requiring longer curing times or harsher conditions leading to productivity and quality issues.

The various methods to make objects using additive-manufacturing relying on UV-light as promoter of polymerizations through the use of photopolymers described in the literature and summarized above such as stereolithography, continuous liquid interphase printing and computer axial lithography are characterized by the production of a polymer frame or scaffold of the object. Further enhancement of the physical properties and performance of the object is typically accomplished using a second polymerization process typically referred to as the curing process. This step can be triggered by different methods such as the use of microwave radiation or more typically by heat. To further enhance the physical properties and performance of the finish object, formulations for various processes might require the presence of additional components in the resin that can be activated for reaction once the scaffold of the object is produced in the photopolymerization process. A possible method to accomplish this step is by the incorporation in the resin site of isocyanates or poly-isocyanates either free or blocked that can be activated in the presence of a suitable curing agent. Thus, it is common to incorporate amine-curatives in the resin site that can be activated towards reaction with suitable substrates such as isocyanates once the photopolymerization process is complete. Therefore, it is preferred that the reactivity of the amine curing agent towards its substrate takes place after the polymer scaffold is produced and not before because premature reactivity can lead to either viscosity increase that will interfere with the mass transfer during the photopolymerization to make the scaffold of the object or worse partial solidification of the resin might occur before use.

Hence, there is a need for amine curing agents that require having sufficient stability in the resin site as to provide: a) sufficient shelf life stability for the resin to provide a shelf life sufficiently long for the resin to be made, stored and transported to the manufacturing locations (minimum 6 months); b) sufficient reactivity that upon activation an object with optimum physical properties and performance can be manufactured by virtue of a secondary polymerization process induced by the amine curatives; c) sufficient chemical compatibility with the resin site as to keep the resin site homogenous and without the development of solids or color during the life of the resin; and d) chemical characteristics that will not cause interference with the preparation of the solid polymer scaffold.

BRIEF SUMMARY OF THE INVENTION

The present invention solves the previously identified problems related to the shelf life stability of resin mixtures comprising a Part A photopolymerizable component and a Part B polymerizable component which comprises an amine-curing agent and a reactive composition such as a blocked isocyanate or polyisocyanate that can polymerize with the amine curing agent to form a second polymer network having the function of improving the physical and mechanical properties of the finished object. Therefore, it is essential that polymerizable Part B do not polymerize prematurely to cause: a) solidification of the resin prior to use; b) undesired increase in viscosity that can affect mass transport or proper handling of the resin; or c) displace an isocyanate protective group that is designed to be part of the photo-induced polymer resulting in undesired disruption of the different polymer networks. On the other hand, an unreactive amine might require longer curing time in detriment of manufacturing productivity or require harsher conditions such as higher temperatures that might lead to damage of the initial object scaffold made by the light induced UV polymerization process. Thus, the new amine curing agents need to be able to provide sufficient shelf life stability to the resin system while at the same time provide curing at relatively low temperature without compromising the intermediate object made during the photopolymerization of the Part A component of the resin.

Alternatively, the present invention is also directed to the use of amine curing agents useful in the preparation of objects by any of the various 3D additive-manufacturing processes such as liquid additive-manufacturing in which a viscous liquid is depositied in layers to form an object that is subsequently cured either by heating or microwave radiation and achieving the manufacturing of objects by methods such as stereolithography, continuous liquid interface production, computed axial lithography or any other additive-manufacturing technique that requires amine-curing to form a polyurea, polyurethane, polyurea-urethane polymer and in which the polymerizable monomers can be discrete diisocyanates or polyisocyanates or blocked diisocyanates or polyisocyanates or oligomers or pre-polymers with various functionalities (typically 2 to 6 and more typically 2 to 3) that are terminated with isocyanate functionalities and the inner chemical chains between the isocyanate functionalities can bear various types of chemical bonds such as ether, urea, urethane, carbon-carbon, carbon-sulfur, carbon-nitrogen, etc.

The resulting compositions and formulations comprise various primary amine curing agents in which either one carbon-atom or two carbon atoms vicinal to the carbon-atom having the primary amine group bears an alkyl-group of increasing size and bulkiness. The alkyl group is preferentially a saturated hydrocarbon group of the type $C_{1-6}$ linear or branched present at both vicinal carbons of the carbon atom bearing a primary amine group or a saturated hydrocarbon group of the type $C_{2-6}$ linear or branched present at only one vicinal carbon-atom to the carbon atom bearing the primary amine group.

The primary amine group is preferentially bound to a cyclic hydrocarbon moiety with 5 to 7 carbon atoms and preferrably 6-carbon atom (cyclohexyl group) and the cyclohexyl groups bearing the primary amine groups are connected by a —CRR'— group where R and R' are independently hydrogen or $C_{1-6}$ alkyl groups. The overall number of primary amine groups present in the curing agent is from 2 to 6 and preferentially 2.

One aspect of the invention relates to the use of an amine composition for preparing an object by a 3D printing process based on dual polymerization, wherein the amine composition comprises at least one amine curing agent with the structure:

(I)

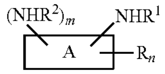

where R is H or a $C_{1-6}$ linear or branched alkyl; where A represents a $C_{6-20}$ cyclic, polycyclic or acyclic linear or branched polyamine; where each of $R^1$ and $R^2$ is H or a $C_{1-9}$ linear or branched alkyl substituent, a cyclic substituent having a heteroatom, or an aromatic substituent; and where n=1 to 6 and where m=1 to 3. Preferably, the polyamine is a diamine or triamine.

In one embodiment, the present invention discloses the use of an amine composition for preparing an object by a 3D printing process based on dual polymerization, wherein the amine composition comprises at least one amine curing agent with the structure:

(I)

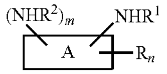

where R is H or a $C_{1-6}$ linear or branched alkyl; where A represents a $C_{6-20}$ cyclic, polycyclic or acyclic linear or branched polyamine; where $R^1$ and $R^2$ are H; where n=1 to 6 and where m=1 to 3. Preferably, the polyamine is a diamine or triamine.

In another embodiment, the present invention discloses the use of an amine composition for preparing an object by a 3D printing process based on dual polymerization, wherein the amine composition comprises at least one amine curing agent with the structure:

(II)

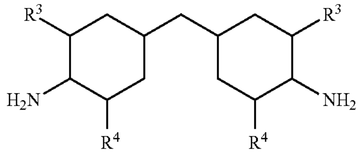

where $R^3$ is H and $R^4$ is $C_{2-6}$ saturated alkyl linear or branched or where $R^3$=$R^4$=$C_{1-6}$ saturated alkyl linear or branched.

In another embodiment, the present invention also discloses the use of an amine composition for preparing an object by a 3D printing process based on dual polymerization, wherein the amine composition comprises the reaction product of at least one amine curing agent with the structure:

(I)

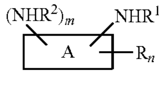

where R is H or a $C_{1-3}$ linear or branched alkyl; where A represents a $C_{6-20}$ cyclic, polycyclic or acyclic linear or branched polyamine; where $R^1$ and $R^2$ are a $C_{1-9}$ linear or branched alkyl substituent, a cyclic substituent having a heteroatom, or an aromatic substituent; and where n=1 to 6 and where m=1 to 3. Preferably, the polyamine is a diamine or triamine. Preferably, $R^1$ and $R^2$ are $C_{1-9}$ linear or branched alkyl substituents including methyl, ethyl, propyl, isopropyl, butyl, isobutyl, sec-butyl, pentyl, neopentyl, isopentyl, sec-pentyl, 3-pentyl, sec-isopentyl, 2-methyl-butyl, hexyl, 2-hexyl, 3-hexyl, iso-hexyl, 4-methylpent-1-yl, 4-methyl-pent-2-yl, 2-methylpent-2-yl and 2-methylpent-1yl, a cyclic substituent having an heteroatom including 2,2,6,6-tetramethylpiperidine-4yl, or an aromatic substituent including benzyl.

In another embodiment, the present invention also discloses the use of an amine composition for preparing an object by a 3D printing process based on dual polymerization, wherein the amine composition comprises the reaction product of i) at least one amine curing agent with the structure:

(III)

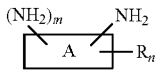

where R is H or a $C_{1-6}$ linear or branched alkyl, where A represents a $C_{6-20}$ cyclic, polycyclic or acyclic linear or branched polyamine, where n=1 to 6 and where m=1 to 3, with ii) at least one α,β-unsaturated carboxylic ester. Preferably, the polyamine is a diamine or triamine. Preferably, the molar ratio of α,β-unsaturated carboxylic ester per primary amine $—NH_2$ moiety is in the range of 4:1 and preferably 3:1 and more preferably 2:1.

Another aspect of the invention relates to a method to make an object using a 3D printing process based on a dual polymerization approach comprising Part A of the resin which is polymerized first by a light induced process preferably using UV light and the intermediate object formed in this process (a scaffold of the object) is then further cured by Part B of the resin comprising the amine curing composition together with isocyanates/polyisocyanates and blocked isocyanates/polyisocyanates which by the effect of microwave radiation or heat leads to the formation of polyurea/polyurethane/polyurea-urethane networks within the object polymer matrix.

The present invention also provides a catalytic hydrogenation method of the corresponding aromatic substrates for preparing the amine composition used as curing agent of the Part B of the resin.

Aromatic precursors for the curing agents of the invention includes 4,4'-methylenebis(2,6-dimethylaniline), 4,4'-methylenebis(2,6-diethylaniline), 4,4'-methylenebis(2,6-di(n-propyl)aniline), 4,4'-methylenebis(2,6-di(sec-propyl)aniline), 4,4'-methylenebis(2,6-di(n-butyl)aniline), 4,4'-methylenebis(2,6-di(sec-butyl)aniline), 4,4'-methylenebis(2,6-di(iso-butyl)aniline), 4,4'-methylenebis(2,6-di(t-butyl)aniline), 4,4'-methylenebis(2,6-di(n-pentyl)aniline), 4,4'-methylenebis(2,6-di(tert-pentyl)aniline), 4,4'-methylenebis(2,6-di(neo-pentyl)aniline), 4,4'-methylenebis(2,6-di(iso-pentyl)aniline), 4,4'-methylenebis(2,6-di(sec-pentyl)aniline), 4,4'-methylenebis(2,6-di(3-pentyl)aniline), 4,4'-methylenebis(2,6-di(sec-isopentyl)aniline), 4,4'-methylenebis(2,6-di(n-hexyl)aniline), 4,4'-methylenebis(2,6-di(2-hexyl)aniline), 4,4'-methylenebis(2,6-di(3-hexyl)aniline), 4,4'-methylenebis(2,6-di(neo-hexyl)aniline), 4,4'-methylenebis(2,6-di(isohexyl)aniline), 4,4'-methylenebis(2,6-di(4-methylpent-1-yl)aniline), 4,4'-methylenebis(2,6-di(4-methylpent-2-yl)aniline), 4,4'-methylenebis(2,6-di(2-methylpent-2-yl)aniline), 4,4'-methylenebis(2,6-di(2-methylpent-1-yl)aniline) and the like.

The various aspects and embodiments herein can be used alone or in combinations with each other.

BRIEF SUMMARY OF THE DRAWINGS

FIG. 1 shows the value for the tensile strength for various specimens made according to the dual polymerization process described herein using amine curatives having different degrees of steric hindrance on their vicinal carbons.

FIG. 2 shows the value for the elongation at break for various specimens made according to the dual polymerization process described herein using amine curatives having different degrees of steric hindrance on their vicinal carbons.

DEFINITIONS

The following definitions are provided in order to aid those skilled in the art in understanding the detailed description of the present invention.

PUR—Polyurethane.

Isocyanate Index—The actual amount of polyisocyanate used divided by the theoretically required stoichiometric amount of polyisocyanate required to react with all the active hydrogen in the reaction mixture, multiplied by 100. Also known as (Eq NCO/Eq of active hydrogen)×100.

pphp—parts by weight per hundred weight parts polyol.

DETAILED DESCRIPTION OF THE INVENTION

The present invention is directed to the use of amine curing agents useful in the preparation of objects by any of the various 3D additive-manufacturing processes such as liquid additive-manufacturing in which a viscous liquid is depositied in layers to form an object that is subsequently cured by either heat or microwave radiation when employing manufacturing methodologies such as stereolithography, continuous liquid interface production, computed axial lithography or any other additive-manufacturing technique that requires amine-curing of a single polymerizable polymer or where the amine-curing polymerization process is part of a dual cured system as described below. Preferably, in the dual polymerization systems such as those used in stereolithography or CLIP method, the first curable system or "Part A" is a polymerizable component that by the effect of radiation such as UV light lead to the formation of a solid object held together by covalent bonds formed during the radical polymerization process.

One aspect of the invention relates to the use of an amine composition for preparing an object by a 3D printing process based on dual polymerization, wherein the amine composition comprises at least one amine curing agent with the structure:

(I)

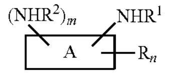

where R is H or a $C_{1-6}$ linear or branched alkyl; where A represents a $C_{6-20}$ cyclic, polycyclic or acyclic linear or branched polyamine; where each of $R^1$ and $R^2$ is H or a $C_{1-9}$ linear or branched alkyl substituent, a cyclic substituent having a heteroatom, or an aromatic substituent; and where n=1 to 6 and where m=1 to 3. Preferably, the polyamine is a diamine or triamine.

In a preferred embodiment, the amine composition comprises at least one amine curing agent with the structure:

(I)

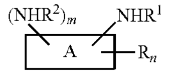

where R is H or a $C_{1-6}$ linear or branched alkyl; where A represents a $C_{6-20}$ cyclic, polycyclic or acyclic linear or branched polyamine; where $R^1$ and $R^2$ are H; where n=1 to 6 and where m=1 to 3. Preferably, the polyamine is a diamine or triamine.

In another preferred embodiment, the amine composition comprises at least one amine curing agent with the structure:

(II)

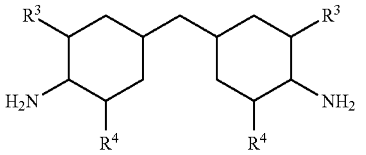

where $R^3$ is H and $R^4$ is $C_{2-6}$ saturated alkyl linear or branched or where $R^3=R^4=C_{1-6}$ saturated alkyl linear or branched. Preferably, the at least one amine curing agent is selected from the group consisting of 4,4'-methylenebis(2-ethylcyclohexylamine), 4,4'-methylenebis(2-(n-propyl)cyclohexylamine), 4,4'-methylenebis(2-(sec-propyl)cyclohexylamine), 4,4'-methylenebis(2-(n-butyl)cyclohexylamine), 4,4'-methylenebis(2-(sec-butyl)cyclohexylamine), 4,4'-methylenebis(2-(iso-butyl)cyclohexylamine), 4,4'-methylenebis(2-(t-butyl)cyclohexylamine), 4,4'-methylenebis(2-(n-pentyl)cyclohexylamine), 4,4'-methylenebis(2-(tert-pentyl)cyclohexylamine), 4,4'-methylenebis(2-(neo-pentyl) cyclohexylamine), 4,4'-methylenebis(2-(iso-pentyl) cyclohexylamine), 4,4'-methylenebis(2-(sec-pentyl) cyclohexylamine), 4,4'-methylenebis(2-(3-pentyl) cyclohexylamine), 4,4'-methylenebis(2-(sec-isopentyl) cyclohexylamine), 4,4'-methylenebis(2-(n-hexyl) cyclohexylamine), 4,4'-methylenebis(2-(2-hexyl) cyclohexylamine), 4,4'-methylenebis(2-(3-hexyl) cyclohexylamine), 4,4'-methylenebis(2-(neo-hexyl) cyclohexylamine), 4,4'-methylenebis(2-(isohexyl) cyclohexylamine), 4,4'-methylenebis(2-(4-methylpent-1-yl) cyclohexylamine), 4,4'-methylenebis(2-(4-methylpent-2-yl) cyclohexylamine), 4,4'-methylenebis(2-(2-methylpent-2-yl) cyclohexylamine), 4,4'-methylenebis(2-(2-methylpent-1-yl) cyclohexylamine), 4,4'-methylenebis(2,6-dimethylcyclohexylamine), 4,4'-methylenebis(2,6-diethylcyclohexylamine), 4,4'-methylenebis(2,6-di(n-propyl)cyclohexylamine), 4,4'-methylenebis(2,6-di(sec-propyl)cyclohexylamine), 4,4'-methylenebis(2,6-di(n-butyl) cyclohexylamine), 4,4'-methylenebis(2,6-di(sec-butyl) cyclohexylamine), 4,4'-methylenebis(2,6-di(iso-butyl) cyclohexylamine), 4,4'-methylenebis(2,6-di(t-butyl) cyclohexylamine), 4,4'-methylenebis(2,6-di(n-pentyl) cyclohexylamine), 4,4'-methylenebis(2,6-di(tert-pentyl) cyclohexylamine), 4,4'-methylenebis(2,6-di(neo-pentyl) cyclohexylamine), 4,4'-methylenebis(2,6-di(iso-pentyl) cyclohexylamine), 4,4'-methylenebis(2,6-di(sec-pentyl) cyclohexylamine), 4,4'-methylenebis(2,6-di(3-pentyl) cyclohexylamine), 4,4'-methylenebis(2,6-di(sec-isopentyl) cyclohexylamine), 4,4'-methylenebis(2,6-di(n-hexyl) cyclohexylamine), 4,4'-methylenebis(2,6-di(2-hexyl) cyclohexylamine), 4,4'-methylenebis(2,6-di(3-hexyl) cyclohexylamine), 4,4'-methylenebis(2,6-di(neo-hexyl) cyclohexylamine), 4,4'-methylenebis(2,6-di(isohexyl) cyclohexylamine), 4,4'-methylenebis(2,6-di(4-methylpent-1-yl)cyclohexylamine), 4,4'-methylenebis(2,6-di(4-methylpent-2-yl)cyclohexylamine), 4,4'-methylenebis(2,6-di(2-methylpent-2-yl)cyclohexylamine), and 4,4'-methylenebis(2,6-di(2-methylpent-1-yl)cyclohexylamine).

In another preferred embodiment, the amine composition comprises at least one amine curing agent with the structure:

(I)

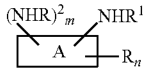

where R is H or a $C_{1-3}$ linear or branched alkyl; where A represents a $C_{6-20}$ cyclic, polycyclic or acyclic linear or branched polyamine; where $R^1$ and $R^2$ are a $C_{1-9}$ linear or branched alkyl substituent, a cyclic substituent having a heteroatom, or an aromatic substituent; and where n=1 to 6 and where m=1 to 3. Preferably, $R^1$ and $R^2$ are $C_{1-9}$ linear or branched alkyl substituents including methyl, ethyl, propyl, isopropyl, butyl, isobutyl, sec-butyl, pentyl, neopentyl, isopentyl, sec-pentyl, 3-pentyl, sec-isopentyl, 2-methyl-butyl, hexyl, 2-hexyl, 3-hexyl, iso-hexyl, 4-methylpent-1-yl, 4-methylpent-2-yl, 2-methylpent-2-yl and 2-methylpent-1yl, a cyclic substituent having an heteroatom including 2,2,6,6-tetramethylpiperidine-4yl, or an aromatic substituent including benzyl. Preferably, the at least one amine curing agent is selected from the group consisting of N,N'-dialkylated PACM (4,4-diaminodicyclohexylmethane), N,N'-dialkylated isophoronediamine, N,N'-dialkylated MACM (4,4'-methylenebis(2-methylcyclohexylamine), N,N'-dialkylated 4-methylcyclohexane-1,3-diamine (MCHD) or N,N'-dialkylated ethylenediamine (EDA) or N,N'-dialkylated propylene diamine (PDA) or N,N'-dialkylated 1,4-butanediamine (BDA), or N,N'-dialkylated 1,5-pentanediamine (PeDA) or N,N'-dialkylated 1,6-hexanediamine (HMDA) or N,N'-dialkylated 4-(aminomethyl)octane-1,8-diamine, or N,N'-dialkylated 1,8-octyldiamine or N,N',N"-trialkylated 4-(aminomethyl)octane-1,8-diamine, N,N',N"-triialkylated tris(2-aminoethyl)amine, tris(3-aminopropyl)amine their mixtures where the alkyl group is preferably methyl, ethyl, propyl, isopropyl, butyl, sec-butyl, isobutyl, pentyl, neopentyl, isopentyl, sec-pentyl, sec-isopentyl, 4-methylpent-2-yl, 2,2,6,6-tetramethylpiperidine-4yl, and benzyl. Most preferably amine curing agents able to be used effectively in 3D printing processes include N,N'-dialkylated PACM (4,4-diaminodicyclohexylmethane), N,N'-dialkylated isophoronediamine, N,N'-dialkylated MACM (4,4'-methylenebis(2-methylcyclohexylamine), N,N'-dialkylated 4-methylcyclohexane-1,3-diamine (MCHD) or N,N'-dialkylated ethylenediamine (EDA) or N,N'-dialkylated propylene diamine (PDA) or N,N'-dialkylated 1,4-butanediamine (BDA), or N,N'-dialkylated 1,5-pentanediamine (PeDA) or N,N'-dialkylated 1,6-hexanediamine (HMDA) or N,N'-dialkylated 4-(aminomethyl)octane-1,8-diamine, or N,N'-dialkylated 1,8-octyldiamine or N,N',N"-trialkylated 4-(aminomethyl)octane-1,8-diamine, N,N',N"-triialkylated tris(2-aminoethyl)amine, tris(3-aminopropyl)amine their mixtures where the alkyl group is preferably isopropyl, sec-butyl, pentyl, isopentyl, sec-pentyl, sec-isopentyl, 4-methylpent-2-yl, 2,2,6,6-tetramethylpiperidine-4yl, and benzyl.

A typical procedure for the preparation of the N,N'-dialkylated and N,N',N"-trialkylated amines involves contacting the diamine or triamine with an equivalent amount of aldehyde or ketone such that the molar ration of aldehyde functionality/primary amine functionality is in the range of 0.9 to 1.2 and in the presence of hydrogen pressure and a metal catalyst where the hydrogen pressure is typically from 200 to 1800 psig and the catalyst is a 5-15% Palladium or Platinum supported on carbon and the temperature of the reaction is from about 80° C. to about 150° C. and more preferably from about 100° C. to about 120° C. Examples of aldehyde and ketones according to this procedure include formaldehyde, acetaldehyde, propionaldehyde, butanal, acetone, methyl-ethylketone, methyl-isobutylketone and triacetonamine. 3-pentanone, hexanal and 2-ethylhexanal, benzaldehyde.

In another preferred embodiment, the amine composition comprises the reaction product of i) at least one amine curing agent with the structure:

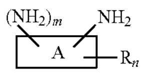

(III)

where R is H or a $C_{1-6}$ linear or branched alkyl, where A represents a $C_{6-20}$ cyclic, polycyclic or acyclic linear or branched polyamine, where n=1 to 6 and where m=1 to 3, with ii) at least one α,β-unsaturated carboxylic ester. Preferably, the amine composition comprises the reaction product of i) 4,4-diaminodicyclohexylmethane (PACM) or 4,4'-methylenebis(2-methylcyclohexylamine (MACM) or 4,4'-methylenebis(2-ethylcyclohexylamine), or 4,4'-methylenebis(2-(n-propyl)cyclohexylamine), or 4,4'-methylenebis(2-(sec-propyl)cyclohexylamine), or 4,4'-methylenebis(2-(n-butyl)cyclohexylamine), or 4,4'-methylenebis(2-(sec-butyl)cyclohexylamine), or 4,4'-methylenebis(2-(iso-butyl)cyclohexylamine), or 4,4'-methylenebis(2-(t-butyl)cyclohexylamine), or 4,4'-methylenebis(2-(n-pentyl)cyclohexylamine), or 4,4'-methylenebis(2-(tert-pentyl)cyclohexylamine), or 4,4'-methylenebis(2-(neo-pentyl)cyclohexylamine), or 4,4'-methylenebis(2-(iso-pentyl)cyclohexylamine), or 4,4'-methylenebis(2-(sec-pentyl)cyclohexylamine), or 4,4'-methylenebis(2-(3-pentyl)cyclohexylamine), or 4,4'-methylenebis(2-(sec-isopentyl)cyclohexylamine), or 4,4'-methylenebis(2-(n-hexyl)cyclohexylamine), or 4,4'-methylenebis(2-(2-hexyl)cyclohexylamine), or 4,4'-methylenebis(2-(3-hexyl)cyclohexylamine), or 4,4'-methylenebis(2-(neo-hexyl)cyclohexylamine), or 4,4'-methylenebis(2-(isohexyl)cyclohexylamine), or 4,4'-methylenebis(2-(4-methylpent-1-yl)cyclohexylamine), or 4,4'-methylenebis(2-(4-methylpent-2-yl)cyclohexylamine), or 4,4'-methylenebis(2-(2-methylpent-2-yl)cyclohexylamine), or 4,4'-methylenebis(2-(2-methylpent-1-yl)cyclohexylamine), or 4,4'-methylenebis(2,6-dimethylcyclohexylamine), or 4,4'-methylenebis(2,6-diethylcyclohexylamine), or 4,4'-methylenebis(2,6-di(n-propyl)cyclohexylamine), or 4,4'-methylenebis(2,6-di(sec-propyl)cyclohexylamine), or 4,4'-methylenebis(2,6-di(n-butyl)cyclohexylamine), or 4,4'-methylenebis(2,6-di(sec-butyl)cyclohexylamine), or 4,4'-methylenebis(2,6-di(iso-butyl)cyclohexylamine), or 4,4'-methylenebis(2,6-di(t-butyl)cyclohexylamine), or 4,4'-methylenebis(2,6-di(n-pentyl)cyclohexylamine), or 4,4'-methylenebis(2,6-di(tert-pentyl)cyclohexylamine), or 4,4'-methylenebis(2,6-di(neo-pentyl)cyclohexylamine), or 4,4'-methylenebis(2,6-di(iso-pentyl)cyclohexylamine), or 4,4'-methylenebis(2,6-di(sec-pentyl)cyclohexylamine), or 4,4'-methylenebis(2,6-di(3-pentyl)cyclohexylamine), or 4,4'-methylenebis(2,6-di(sec-isopentyl)cyclohexylamine), or 4,4'-methylenebis(2,6-di(n-hexyl)cyclohexylamine), or 4,4'-methylenebis(2,6-di(2-hexyl)cyclohexylamine), or 4,4'-methylenebis(2,6-di(3-hexyl)cyclohexylamine), or 4,4'-methylenebis(2,6-di(neo-hexyl)cyclohexylamine), or 4,4'-methylenebis(2,6-di(isohexyl)cyclohexylamine), or 4,4'-methylenebis(2,6-di(4-methylpent-1-yl)cyclohexylamine), or 4,4'-methylenebis(2,6-di(4-methylpent yl)cyclohexylamine), or 4,4'-methylenebis(2,6-di(2-methylpent-2-yl)cyclohexylamine), or 4,4'-methylenebis(2,6-di(2-methylpent-1-yl)cyclohexylamine or 4-methylcyclohexane-1,3-diamine (MCHD) or ethylenediamine (EDA) or propylene diamine (PDA) or 1,4-butanediamine (BDA), or 1,5-pentanediamine (PeDA) or 1,6-hexanediamine (HMDA) or 4-(aminomethyl) octane-1,8-diamine, or 1,8-octyldiamine or any mixture thereof with ii) methylacrylate, ethylacrylate, propylacrylate, butylacrylate, pentylacrylate, hexylacrylate, dimethylmaleate, diethylmaleate, dipropylmaleate, dibutylmaleate, dipentylmaleate, dihexylmaleate dimethylfumarate, diethylfumarate, dipropylfumarate, dibutylfumarate, dipentylfumarate, dihexylfumarate or any mixture thereof.

Most preferably the amine composition able to be used effectively in 3D printing processes comprises the reaction product of i) at least one amine curing agent selected from the group consisting of PACM (4,4-diaminodicyclohexylmethane) or 4-methylcyclohexane-1,3-diamine (MCHD) or ethylenediamine (EDA) or propylene diamine (PDA) or 1,4-butanediamine (BDA), or 1,5-pentanediamine (PeDA) or 1,6-hexanediamine (HMDA) or 4-(aminomethyl)octane-1,8-diamine, or 1,8-octyldiamine or their mixtures, with ii) methylacrylate, ethylacrylate, dimethylmaleate, diethylmaleate, dimethylfumarate, diethylfumarate and their mixtures.

"Part A" is preferably composed of any suitable polymerizable liquid that can include a monomer or a mixture of monomers that is able to photopolymerize in the presence of light and/or with a free radical initiator and where the radical initiator can induce the polymerization of the monomers, and where the initiator is either a single initiator or a mixture of suitable initiators and where the process can be induced by light in the presence or absence of such initiators.

Preferable compounds for the Part A of the resin include, but are not limited to, acrylics, methacrylics, acrylamides, substituted and unsubstituted olefins (cyclic or acyclic with substituents including OH, halogen, alkyl, aryl, aryl-alkyl, ether, esters, etc), maleic and fumaric based compounds, alkynes, CO, functionalized oligomers and prepolymers such as acrylic esters of polyethylene glycol (PEG), polypropylene glycol (PPG), polytetramethylene glycol (PTMEG), polyhexamethylene glycol (PHMEG), blocked isocyanates, polyisocyanates and polyurea and or polyurethane based polyisocyanate terminated polymers and oligomers blocked with blocking agents bearing acrylic, methacrylic and other olefinic light induced polymerizable organic functionalities able to provide 3D objects with or without the air of photoinitiators.

Examples of liquid resins, monomers and initiators include but are not limited to those described in U.S. Pat. Nos. 7,649,029; 7,767,728; 7,935,476; 8,119,214; 8,232,043; WO2012129968 A1; CN102715751; A JP2012210408A which are incorporated as references.

Light induced polymerization of the resin can also be accomplished via photoinduced cationic or acidic polymerization. Such photopolymerization process can be achieved using polymerizable liquid monomers containing organic functionalities able to be activated by acids or cations such as oxirane (epoxy) groups, vinyl ether groups, etc.

Thus in one embodiment polymerization of Part A of the resin can be accomplished by ionic and or non-ionic photoacid generators including but not limited to sulfonium salts, ionium salts, and iodonium salts such as diphenyl iodide salts, triphenylsulfonium salts, diphenyl p-methoxyphenyltriflate, diphenyl p-toluenyl triflate, diphenyl p-isobutylphenyl triflate, diphenyl p-tert-butylphenyl triflate and the like and mixtures thereof.

The photoacid generated by light can induce the polymerization of various types of monomers present in Part A of the resin including olefins such as styrene, methylvinyl ether, 4-methoxystyrene, styrene, 2-methylprop-1-ene, 1,3-butadiene, etc.; heterocyclic monomers (including lactones, lactams, and cyclic amines) such as oxirane, thietane, tetrahydrofuran, oxazoline, 1.3, dioxepane, oxetan-2-one, etc., and combinations thereof.

Non-limiting examples of monomers, liquid resins and various types of initiators are described in U.S. Pat. Nos. 7,649,029; 7,767,728; 7,935,476; 8,119,214; 8,232,043; WO2012129968A1; CN102715751A; JP2012210408A which are incorporated as references herein.

In some embodiments Part A of the resin includes acrylate-modified PEG hydrogels or PEG hydrogels modified with other suitable functionality able to photopolymerize. In some embodiments such polymerizable hydrogel materials can be made from gelatins made by denaturation of collagen which can be subsequently modified with photopolymerizable substrates such as acrylic, methacrylic or other unsaturated organic compounds.

In some embodiments Part A of the resin can include UV curable silicones and/or silicone rubber materials such as LOCTITE™ AA 3462; LOCTITE™ AA 3494; LOCTITE™ AA 352; LOCTITE™ AA 3953; LOCTITE™ AA 3951; Siliopren™UV LSR 2030, Siliopren™UV LSR 2060, Siliopren™UV Gel 100 and other similar UV-curable silicone-based materials.

In some embodiments Part A of the resin includes biodegradable materials which are particularly used in medical devices and medical application where polymer degradation by biological tissues is necessary. Lactic acid and glycolic acid copolymers are examples of biodegradable materials that can be dissolved in PEG-methacrylate capped di-ester to yield a component suitable for Part A of the resin.

In some embodiments photopolymerizable components of Part A of the resin can comprise a polyurethane oligomer, polymer or pre-polymer based on an aliphatic diisocyanate such as IPDI (isophorone diisocyanate) or HMDI (hexamethylene diisocyanate) and a diol (ethylene glycol, diethylene glycol, 1,4-butanediol, polyethylene glycols, etc) or a polyurethane/polyurea prepolymer based on IPDI (isophorone diisocyanate) or HMDI (hexamethylene diisocyanate) and a combination of a diol and diamine together with a polyfunctional acrylic ester and a photoinitiator or mixtures of photoinitiators.

In some embodiments, liquid crystalline polymers of esters, ester-imide, and ester-amide oligomers can be a component of Part A resin and they might require heating to induce melting. These liquid crystalline resins can be employed together with a photocurable polymer or photocurable monomer in the presence of a photoinitiator such as benzophenone, anthraquinone, fluoroenone, etc. to promote polymerization when irradiated with a suitable light source.

In some embodiments solid particles with sizes ranging from 1 nm to 20 μm average diameter suspended or dispersed in Part A of the liquid resin can be used including metallic, organic/polymeric, inorganic, or composites or mixtures thereof where the suspended or dispersed particles can be nonconductive, semi-conductive, or conductive (including metallic and non-metallic or polymer conductors); and the particles can be magnetic, ferromagnetic, paramagnetic, or nonmagnetic.

In some embodiments additional components can be present in Part A of the resin as solubilized or suspended additives including pigments, dyes, active compounds including proteins, peptides, nucleic acids (DNA, RNA) such as siRNA, sugars, small organic compounds (drugs and drug-like compounds), etc.

In some embodiments, Part A of the resin can comprise light absorbers such as carbon black, UV organic light absorbers including benzotriazoles, hydroxybenzophenone, thioxanthone, triazines, titanium dioxide, etc. as described in the prior art (U.S. Pat. Nos. 7,695,643, 7,157,586, 6,916,867 and 3,213,058).

In some embodiments the mixture of Part A and Part B of the resin can have radical inhibitors in liquid or gaseous form such as oxygen gas, liquid inhibitors such as oils or lubricants (e.g., fluorinated oils such as perfluoropolyethers) may be employed, as inhibitors or as release layers that maintain a liquid interface or in some more specific embodiments such as polymerization induced by photoacids where the inhibitor can actually be bases such as ammonia, trace amines (e.g. methylamine, ethyl amine, di and trialkyl amines such as dimethylamine, diethyl amine, trimethyl amine, triethylamine, etc.) or carbon dioxide, and their mixtures.

In some embodiments, where polymerizable liquids are aqueous, and may be oxygenated, living cells from plant (e.g., monocot, dicot), animal (e.g., mammalian, avian, amphibian, reptile cells), microbial (e.g., prokaryote, eukaryote, protozoal, etc.), etc. can be carried as particles or in the form of living emulsions where the living cells form a discrete phase. The polymerizable liquid can in these cases form a hydrogel such as those described in the prior art (U.S. Pat. Nos. 7,651,683; 7,651,682; 7,556,490; 6,602,975 and 5,836,313).

As noted above, in some embodiments of the invention, the polymerizable liquid comprises a first light-polymerizable component referred as Part A and a second component that solidifies by a different mechanism, or in a different manner than the first component and this second component is referred as Part B. The Part B component contributes to the manufacturing of the object by further reacting, polymerizing, or chain extending leading to the improved quality and performance of the finished object.

As noted above, Part A comprises a mixture of monomers and/or prepolymers that can be polymerized by exposure to radiation or light. The purpose of Part A is to "lock" the shape of the object being formed or create a scaffold of the object to be manufactured. Part A must be present at or above the minimum quantity needed to maintain the shape of the object being formed after the initial solidification in a manner the object scaffold can be handled and processed. In some embodiments, this amount corresponds to less than ten, twenty, or thirty percent by weight of the total polymerizable liquid resin composition. In some embodiments, Part A can react to form a crosslinked polymer network or a solid homopolymer.

Preferable compounds for the Part A of the resin include, but are not limited to, acrylics, methacrylics, acrylamides, substituted and unsubstituted olefins (cyclic or acyclic with substituents including OH, halogen, alkyl, aryl, aryl-alkyl, ether, esters, etc), maleic and fumaric based compounds, alkynes, CO, functionalized oligomers and prepolymers such as acrylic esters of polyethylene glycol (PEG), polypropylene glycol (PPG), polytetramethylene glycol (PTMEG), polyhexamethylene glycol (PHMEG), blocked isocyanates, polyisocyanates and polyurea and or polyurethane based polyisocyanate terminated polymers and oligomers blocked with blocking agents bearing acrylic, methacrylic and other olefinic light induced polymerizable organic functionalities able to provide 3D objects with or without the air of photoinitiators.

Upon Part A solidification, the object scaffold bearing in it the second reactive resin component or Part B can solidify during a second step which may occur concurrently with or following the solidification of Part A. It is necessary that secondary polymerization preferably occurs without significantly distorting the original shape defined during the solidification of Part A unless the distortion of the original shape occurs in a controlled and desired manner. In some additive-manufacturing processes such as the CLIP™ process the solidification of Part A might be inhibited in certain parts of the printing device by oxygen or amines or other reactive species so that the object does not adhere to the window and the resin material can be constantly present at the growing liquid-solid interphase of the object.

Part B comprises a mix of monomers and/or oligomers or prepolymers that possess reactive end groups that participate in a second solidification reaction after the solidification of Part A. In some embodiments, Part B could be added simultaneously to Part A so it is present during the exposure to radiation, or Part B could be infused into the object made during the 3D printing process in a subsequent step. Part B can be solidified in various ways including but not limited to, contacting the object or scaffold to heat, water, water vapor, light at a different wavelength than that used in Part A, catalysts with or without additional heat, evaporation of a solvent from the polymerizable liquid (e.g., using heat, vacuum, or a combination thereof), microwave irradiation, etc., including combinations thereof.

Examples of suitable reactive end-group pairs suitable for Part B constituents, monomers or prepolymers include, but are not limited to: epoxy/amine, epoxy/hydroxyl, oxetane/amine, oxetane/alcohol, isocyanate/hydroxyl, isocyanate/amine, isocyanate/carboxylic acid, anhydride/amine, amine/carboxylic acid, amine/ester, hydroxyl/carboxylic acid, hydroxyl/acid chloride, amine/acid chloride, vinyl/Si—H (hydrosilylation), Si—Cl/hydroxyl, Si—Cl/amine, hydroxyl/aldehyde, amine/aldehyde, hydroxymethyl or alkoxymethyl amide/alcohol, alkyne/azide along with additional reactions including thiol-ene or alkene hydrothiolation (thiolene reactions), Michael additions, Diels-Alder reactions, nucleophilic substitution reactions, alkene/sulfur (vulcanization), alkene/peroxide, alkene/thiol, alkyne/thiol, hydroxyl/halide, isocyanate/water (polyurethane foams), Si—OH/hydroxyl, Si—OH/water, Si—OH/Si—H (tin catalyzed silicone), SiOH/Si—OH (tin catalyzed silicone), perfluorovinyl (coupling to form perfluorocyclobutane), etc.

Isocyanates include protected isocyanates (oximes), diene/dienophiles for Diels-Alder reactions, olefin metathesis polymerization, olefin polymerization using Ziegler-Natta catalysis, ring-opening polymerization (including ring opening olefin metathesis polymerization, lactams, lactones, siloxanes, epoxides, cyclic ethers, imines, cyclic acetals, etc.), etc.

In one embodiment, preferably the amine composition of the invention for Part B can be used with any of the following reactive end-group pairs including epoxy/amine, oxetane/amine, anhydride/amine, amine/carboxylic acid, amine/ester, amine/acid chloride and Si—Cl/amine, amine/aldehyde.

More preferably, the amine composition of the invention for Part B can be used to cure isocyanate/polyisocyante and/or blocked isocyanate/polyisocyanate composition in the presence or in the absence of other reactive end-group pairs such as epoxy/amine, oxetane/amine, anhydride/amine, amine/carboxylic acid, amine/ester, amine/acid chloride Si—Cl/amine and amine/aldehyde.

In some embodiments organic peroxide may be included in the polymerizable liquid or resin to facilitate the reaction of potentially unreacted double bonds or to complete the radical polymerization process of double bonds during heat-induced curing part and/or when using microwave irradiation. Organic peroxides may be included in the resin or polymerizable liquid in any suitable amount and preferably from 0.001 or 0.01 or 0.1 percent by weight, up to 1, 2, or 3 percent by weight. Common peroxides include 2.5-bis (tert-butylperoxy)-2,5-dimethylhexane, dilauroyl peroxide, benzoyl peroxide, and bis(tert butyldioxyisopropyl)benzene and the like and their combinations.

In some embodiments the invention is directed towards the additive-manufacture of elastomeric, thermoplastic and thermosetting objects of multiple shapes using the solidification of Part A followed by aligning those objects in a particular configuration, such that there is a hermetic seal between the objects, then activate the secondary solidification step for Part B where the amine composition of the invention participates in the formation of an additional covalent network as descried above. In this manner, strong adhesion between parts can be achieved during production.

In some embodiments, the amines of the invention that form Part B may be pre-formed into a polymer which upon solidification of Part A the resulting object may be heated above the glass transition temperature in order to fuse the pre-formed polymeric particles.

In some embodiments, the amine of the invention in Part B may be part of a preformed polymer dissolved in a solvent that upon solidification of Part A into an object followed by solvent removal under vacuum or heat or both leads to the solidification of the preformed polymer bearing the amine composition of the invention.

In some embodiments, Part A might carry with it chemically protected reactive functionalities that can be thermally activated to generate new reactive species following the solidification of Part A. These new reactive functionalities can react with the amine composition of the invention leading to a second solidification process. Preferably, isocyanate-blocked precursor are used in these cases and effectively the isocyanate functionalities can be regenerated by heat once the object was formed after the light-induced polymerization of Part A. The amine composition of the invention can participate in a secondary polymerization process with the heat-generated isocyanate functionalities to generate a second polymer network having polyurea/polyurethane/polyurethane-urea functionalities. Mechanistically the thermal dissociation of the blocking agent form the isocyanate functionality might also happen in a concerted manner where the amine composition of the invention displaces the isocyanate protective group leading to the second polymer network.

In some embodiments, Part A and Part B having the amine composition of the invention might be mixed "in situ" in the polymerizing chamber to avoid premature solidification or reaction between the amine composition and the isocyanate-blocked component. Preferably, when the resin is introduced to the printer in this fashion solidification of Part A by light induced process will occur at a faster pace than the solidification of Part B which requires additional energy (heat) to complete the curing process. In other words, the rate of curing of Part B is much slower than that of light induced polymerization of Part A and Part B can be cured once the scaffold of the object is produced via light induced polymerization of Part A.

The curing compositions described in the current invention will be useful in other additive manufacturing techniques including fused deposition modeling (FDM), solid laser sintering (SLS), and ink-jet methods. For example, a melt-processed acrylonitrile-butadiene-styrene resin may be formulated with a second UV-curable component that can be activated after the object is formed by FDM. New mechanical properties could be achieved in this manner.

In some embodiments, the amine curing composition reacts with the isocyanate or isocyanate precursor after the irradiating step (e.g., by heating or microwave irradiating) and under conditions in which the solid polymer scaffold degrades and forms a constituent necessary for the polymerization of the second component. In this step a prepolymer, a diisocyanate or polyisocyanate, is generated that further reacts with the amine composition component to form a polyurethane/polyurea resin. These methods involve the use of reactive or non-reactive blocking groups coupled to a constituent of the first component, such that the constituent participates in the first hardening event (light induced), and when de-protected generates a free constituent that can participate in the second solidifying and/or curing event.

Preferable "dual cure' embodiments where the amine composition of the invention is useful include methods of forming a three-dimensional object comprising the following steps: a) getting in contact in an optically transparent build surface a polymerizable liquid in the presence of at least one of a reactive diluent, photoinitiator, and chain extender, wherein the polymerizable liquid comprises at least one of i) a monomer, ii) a blocked or reactive blocked oligomer or iii) a blocked or reactive blocked prepolymer; b) irradiating the build region with light that passes through a radiation-transparent window to form a solid scaffold object; c) heating or microwaving to induce the polymerization of the at least one of a monomer, a blocked or reactive blocked oligomer or a blocked or reactive blocked prepolymer with an amine composition to form the three-dimensional object, wherein the amine composition comprises at least one amine curing agent with the structure:

(I)

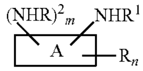

where R is H or a $C_{1-6}$ linear or branched alkyl; where A represents a $C_{6-20}$ cyclic, polycyclic or acyclic linear or branched polyamine; where each of $R^1$ and $R^2$ is H or a $C_{1-9}$ linear or branched alkyl substituent, a cyclic substituent having a heteroatom, or an aromatic substituent; and where n=1 to 6 and where m=1 to 3. Preferably, the polyamine is a diamine or triamine.

In a preferred embodiment of the method, the amine composition comprises at least one amine curing agent with the structure:

(I)

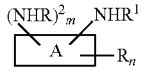

where R is H or a $C_{1-6}$ linear or branched alkyl; where A represents a $C_{6-20}$ cyclic, polycyclic or acyclic linear or branched polyamine; where $R^1$ and $R^2$ are H; where n=1 to 6 and where m=1 to 3. Preferably, the polyamine is a diamine or triamine.

In another preferred embodiment of the method, the amine composition comprises at least one amine curing agent with the structure:

(II)

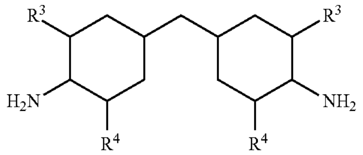

where $R^3$=H and $R^4$=$C_{2-6}$ saturated alkyl linear or branched or where $R^3$=$R^4$=$C_{1-6}$ saturated alkyl linear or branched. Preferably, the at least one amine curing agent is selected from the group consisting of 4,4'-methylenebis(2-ethylcyclohexylamine), 4,4'-methylenebis(2-(n-propyl)cyclohexylamine), 4,4'-methylenebis(2-(sec-propyl)cyclohexylamine), 4,4'-methylenebis(2-(n-butyl)cyclohexylamine), 4,4'-methylenebis(2-(sec-butyl)cyclohexylamine), 4,4'-methylenebis(2-(iso-butyl)cyclohexylamine), 4,4'-methylenebis(2-(t-butyl)cyclohexylamine), 4,4'-methylenebis(2-(n-pentyl)cyclohexylamine), 4,4'-methylenebis(2-(tert-pentyl)cyclohexylamine), 4,4'-methylenebis(2-(neo-pentyl)cyclohexylamine), 4,4'-methylenebis(2-(iso-pentyl)cyclohexylamine), 4,4'-methylenebis(2-(sec-pentyl)cyclohexylamine), 4,4'-methylenebis(2-(3-pentyl)cyclohexylamine), 4,4'-methylenebis(2-(sec-isopentyl)cyclohexylamine), 4,4'-methylenebis(2-(n-hexyl)cyclohexylamine), 4,4'-methylenebis(2-(2-hexyl)cyclohexylamine), 4,4'-methylenebis(2-(3-hexyl)cyclohexylamine), 4,4'-methylenebis(2-(neo-hexyl)cyclohexylamine), 4,4'-methylenebis(2-(isohexyl)cyclohexylamine), 4,4'-methylenebis(2-(4-methylpent-1-yl)cyclohexylamine), 4,4'-methylenebis(2-(4-methylpent-2-yl)cyclohexylamine), 4,4'-methylenebis(2-(2-methylpent-2-yl)cyclohexylamine), 4,4'-methylenebis(2-(2-methylpent-1-yl)cyclohexylamine), 4,4'-methylenebis(2,6-dimethylcyclohexylamine), 4,4'-methylenebis(2,6-diethylcyclohexylamine), 4,4'-methylenebis(2,6-di(n-propyl)cyclohexylamine), 4,4'-methylenebis(2,6-di(sec-propyl)cyclohexylamine), 4,4'-methylenebis(2,6-di(n-butyl)cyclohexylamine), 4,4'-methylenebis(2,6-di(sec-butyl)cyclohexylamine), 4,4'-methylenebis(2,6-di(iso-butyl)cyclohexylamine), 4,4'-methylenebis(2,6-di(t-butyl)cyclohexylamine), 4,4'-methylenebis(2,6-di(n-pentyl)cyclohexylamine), 4,4'-methylenebis(2,6-di(tert-pentyl)cyclohexylamine), 4,4'-methylenebis(2,6-di(neo-pentyl)cyclohexylamine), 4,4'-methylenebis(2,6-di(iso-pentyl)cyclohexylamine), 4,4'-methylenebis(2,6-di(sec-pentyl)cyclohexylamine), 4,4'-methylenebis(2,6-di(3-pentyl)cyclohexylamine), 4,4'-methylenebis(2,6-di(sec-isopentyl)cyclohexylamine), 4,4'-methylenebis(2,6-di(n-hexyl)cyclohexylamine), 4,4'-methylenebis(2,6-di(2-hexyl)cyclohexylamine), 4,4'-methylenebis(2,6-di(3-hexyl)cyclohexylamine), 4,4'-methylenebis(2,6-di(neo-hexyl)cyclohexylamine), 4,4'-methylenebis(2,6-di(isohexyl)cyclohexylamine), 4,4'-methylenebis(2,6-di(4-methylpent-1-yl)cyclohexylamine), 4,4'-methylenebis(2,6-di(4-methylpent-2-yl)cyclohexylamine), 4,4'-methylenebis(2,6-di(2-methylpent-2-yl)cyclohexylamine), and 4,4'-methylenebis(2,6-di(2-methylpent-1-yl)cyclohexylamine).

In another preferred embodiment of the method, the amine composition comprises at least one amine curing agent with the structure:

(I)

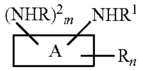

where R is H or a $C_{1-3}$ linear or branched alkyl; where A represents a $C_{6-20}$ cyclic, polycyclic or acyclic linear or branched polyamine; where $R^1$ and $R^2$ are a $C_{1-9}$ linear or branched alkyl substituent, a cyclic substituent having a heteroatom, or an aromatic substituent; and where n=1 to 6 and where m=1 to 3. Preferably, the polyamine is a diamine or triamine. Preferably, the at least one amine curing agent is selected from the group consisting of N,N'-dialkylated 4,4-diaminodicyclohexylmethane, N,N'-dialkylated isophoronediamine, N,N'-dialkylated 4,4'-methylenebis(2-methylcyclohexylamine), N,N'-dialkylated 4-methylcyclohexane-1,3-diamine, N,N'-dialkylated ethylenediamine, N,N'-dialkylated propylene diamine, N,N'-dialkylated 1,4-butanediamine, N,N'-dialkylated 1,5-pentanediamine, N,N'-dialkylated 1,6-hexanediamine, N,N'-dialkylated 4-(aminomethyl)octane-1,8-diamine, N,N'-dialkylated 1,8-octyldiamine, N,N',N''-trialkylated 4-(aminomethyl)octane-1,8-diamine, N,N',N''-triialkylated tris(2-aminoethyl)amine, tris(3-aminopropyl)amine, and mixtures thereof; wherein the alkyl group is selected from the group consisting of methyl, ethyl, propyl, isopropyl, butyl, sec-butyl, isobutyl, pentyl, neopentyl, isopentyl, sec-pentyl, sec-isopentyl, 4-methylpent-2-yl, 2,2,6,6-tetramethylpiperidine-4yl, and benzyl.

In another preferred embodiment of the method, the amine composition comprises the reaction product of i) at least one amine curing agent with the structure:

(III)

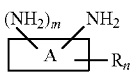

where R is H or a $C_{1-6}$ linear or branched alkyl, where A represents a $C_{6-20}$ cyclic, polycyclic or acyclic linear or branched polyamine, where n=1 to 6 and where m=1 to 3, with ii) at least one α,β-unsaturated carboxylic ester. Preferably, the polyamine is a diamine or triamine. Preferably, the amine composition comprises the reaction product of i) 4,4-diaminodicyclohexylmethane or 4,4'-methylenebis(2-methylcyclohexylamine or 4,4'-methylenebis(2-ethylcyclohexylamine), or 4,4'-methylenebis(2-(n-propyl)cyclohexylamine), or 4,4'-methylenebis(2-(sec-propyl)cyclohexylamine), or 4,4'-methylenebis(2-(n-butyl)cyclohexylamine), or 4,4'-methylenebis(2-(sec-butyl)cyclohexylamine), or 4,4'-methylenebis(2-(iso-butyl)cyclohexylamine), or 4,4'-methylenebis(2-(t-butyl)cyclohexylamine), or 4,4'-methylenebis(2-(n-pentyl)cyclohexylamine), or 4,4'-methylenebis(2-(tert-pentyl)cyclohexylamine), or 4,4'-methylenebis(2-(neo-pentyl)cyclohexylamine), or 4,4'-methylenebis(2-(iso-pentyl)cyclohexylamine), or 4,4'-methylenebis(2-(sec-pentyl)cyclohexylamine), or 4,4'-methylenebis(2-(3-pentyl)cyclohexylamine), or 4,4'-methylenebis(2-(sec-isopentyl)cyclohexylamine), or 4,4'-methylenebis(2-(n-hexyl)cyclohexylamine), or 4,4'-methylenebis(2-(2-hexyl)cyclohexylamine), or 4,4'-methylenebis(2-(3-hexyl)cyclohexylamine), or 4,4'-methylenebis(2-(neo-hexyl)cyclohexylamine), or 4,4'-methylenebis(2-(isohexyl)cyclohexylamine), or 4,4'-methylenebis(2-(4-methylpent-1-yl)cyclohexylamine), or 4,4'-methylenebis(2-(4-methylpent-2-yl)cyclohexylamine), or 4,4'-methylenebis(2-(2-methylpent-2-yl)cyclohexylamine), or 4,4'-methylenebis(2-(2-methylpent-1-yl)cyclohexylamine), or 4,4'-methylenebis(2,6-dimethylcyclohexylamine), or 4,4'-methylenebis(2,6-diethylcyclohexylamine), or 4,4'-methylenebis(2,6-di(n-propyl)cyclohexylamine), or 4,4'-methylenebis(2,6-di(sec-propyl)cyclohexylamine), or 4,4'-methylenebis(2,6-di(n-butyl)cyclohexylamine), or 4,4'-methylenebis(2,6-di(sec-butyl)cyclohexylamine), or 4,4'-methylenebis(2,6-di(iso-butyl)cyclohexylamine), or 4,4'-methylenebis(2,6-di(t-butyl)cyclohexylamine), or 4,4'-methylenebis(2,6-di(n-pentyl)cyclohexylamine), or 4,4'-methylenebis(2,6-di(tert-pentyl)cyclohexylamine), or 4,4'-methylenebis(2,6-di(neo-pentyl)cyclohexylamine), or 4,4'-methylenebis(2,6-di(iso-pentyl)cyclohexylamine), or 4,4'-methylenebis(2,6-di(sec-pentyl)cyclohexylamine), or 4,4'-methylenebis(2,6-di(3-pentyl)cyclohexylamine), or 4,4'-methylenebis(2,6-di(sec-isopentyl)cyclohexylamine), or 4,4'-methylenebis(2,6-di(n-hexyl)cyclohexylamine), or 4,4'-methylenebis(2,6-di(2-hexyl)cyclohexylamine), or 4,4'-methylenebis(2,6-di(3-hexyl)cyclohexylamine), or 4,4'-methylenebis(2,6-di(neo-hexyl)cyclohexylamine), or 4,4'-methylenebis(2,6-di(isohexyl)cyclohexylamine), or 4,4'-methylenebis(2,6-di(4-methylpent-1-yl)cyclohexylamine), or 4,4'-methylenebis(2,6-di(4-methylpent-2-yl)cyclohexylamine), or 4,4'-methylenebis(2,6-di(2-methylpent-2-yl)cyclohexylamine), or 4,4'-methylenebis(2,6-di(2-methylpent-1-yl)cyclohexylamine or 4-methylcyclohexane-1,3-diamine (MCHD) or ethylenediamine (EDA) or propylene diamine (PDA) or 1,4-butanediamine (BDA), or 1,5-pentanediamine (PeDA) or 1,6-hexanediamine (HMDA) or 4-(aminomethyl)octane-1,8-diamine, or 1,8-octyldiamine or any mixture thereof with ii) methylacrylate, ethylacrylate, propylacrylate, butylacrylate, pentylacrylate, hexylacrylate, dimethylmaleate, diethylmaleate, dipropylmaleate, dibutylmaleate, dipentylmaleate, dihexylmaleate dimethylfumarate, diethylfumarate, dipropylfumarate, dibutylfumarate, dipentylfumarate, dihexylfumarate or any mixture thereof.

In some embodiments, preferably the amine composition comprises the reaction product of i) at least one amine curing agent selected from the group consisting of PACM (4,4-diaminodicyclohexylmethane) or 4-methylcyclohexane-1,3-diamine (MCHD) or ethylenediamine (EDA) or propylene diamine (PDA) or 1,4-butanediamine (BDA), or 1,5-pentanediamine (PeDA) or 1,6-hexanediamine (HMDA) or 4-(aminomethyl)octane-1,8-diamine, or 1,8-octyldiamine or their mixtures, with ii) methylacrylate, ethylacrylate, dimethylmaleate, diethylmaleate, dimethylfumarate, diethylfumarate and their mixtures.

In some embodiments, preferably the blocked or reactive blocked prepolymer comprises at least one of a diisocyanate prepolymer, a polyisocyanate prepolymer, and a polyisocyanate oligomer. In some embodiments, preferably the blocked or reactive blocked prepolymer comprises a diisocyanate prepolymer or polyisocyanate prepolymer made by the condensation of an isocyanate or polyisocyanate with a polyol or a polyamine or a combination of both to make a polyurethane or a polyurea on a polyurethane/polyurea prepolymer that is terminated with isocyanate functionality. In some embodiments the isocyanate functionality can be totally or partially blocked with an isocyanate blocking agent.

In some embodiments, preferably the blocked or reactive blocked prepolymer comprises a polyisocyanate oligomer produced by the reaction of at least one diisocyanate (e.g., a diisocyanate such as hexamethylene diisocyanate (HMDI), isophorone diisocyanate (IPDI), bis-(4 isocyanatocyclohexyl) methane, a triisocyanate, etc.) with at least one polyol (e.g., a polyether polyol or polyester polyol or polybutadiene diol or polybutadiene polyol).

In some embodiments, preferably the reactive blocked prepolymer is blocked by reaction of a polyisocyanate with a blocking agent selected from the group consisting of 2-(tert-butylamino)ethyl methacrylate (TBAEMA), 2-(tert-pentylamino)ethyl methacrylate (TPAEMA), 2-(tert-hexylamino)ethylmethacrylate (THAEMA), 3-(tert-butylamino) propyl methacrylate (TBAPMA), other similar acrylate compounds, and mixtures thereof.

In some embodiments, preferably the acrylate-based isocyanate blocking agents can be used as diluents as well. In some embodiments any other blocking agents for isocyanate can also be used. Preferred embodiments for the blocking agent include TBAEMA. Additional preferred blocking agents that can be used to carry out the present invention through esterification or amidation reaction of methacrylic acid with suitable sterically hindered N-substituted amine-alcohols and diamines. Similar examples include maleimide, or substitute maleimide on other known blocking agents, for use in the present invention.

Other known preferred isocyanate-blocking agents include, but are not limited to phenol, cresol, xylenol, nitrophenol, chlorophenol, ethyl phenol, t-butylphenol, hydroxybenzoic acid, hydroxybenzoic acid esters, 2,5-di-t-butyl-4-hydroxy toluene, lactam type blocking agents, active methylene type blocking agents such as diethyl malonate, dimethyl malonate, ethyl acetoacetate, methyl acetoacetate, acetyl acetone, alcohol type blocking agents such as methanol, ethanol, n-propanol, isopropanol, n-butanol, isobutanol, t-butanol, n-amyl alcohol, t-amyl alcohol, lauryl alcohol, ethylene glycol monomethyl ether, ethylene glycol monoethyl ether, ethylene glycol monobutyl ether, diethylene glycol monomethyl ether, diethylene glycol monoethyl ether, propylene glycol monomethyl ether, methoxyethanol, glycolic acid, glycolic acid esters, lactic acid, lactic acid ester, methylol urea, methylol melamine, diacetone alcohol, ethylene chlorohydrine, ethylene bromhydrine, 1,3-dichloro-2-propanol, O-hydroperfluoro alcohol, acetocyanhydrine, mercaptan type blocking agents such as butyl mercaptan, hexylmercaptan, t-butyl mercaptan, t-dodecyl mercaptan, 2-mercapto-benzothiazole, thiophenol, methyl thiophenol, ethyl thiophenyl, acid amide type blocking agents such as acetoanilide, acetoanisidine amide, acrylamide, methacrylamide, acetic amide, stearic amide, benzamide, imide type blocking agents such as succinimide, phthalimide, maleimide, amine type blocking agents such as diphenylamine, phenylnaphthylamine, xylidine, N-phenyl xylidine, carbazole, aniline, naphthylamine, butylamine, dibutylamine, butyl phenylamine, imidazole type blocking agents such as imidazole, 2-ethylimidazole, urea type blocking agents such as urea, thiourea, ethylene urea, ethylenethiourea, 1,3-diphenyl urea, carbamate type blocking agents such as N-phenyl carbamic acid phenyl ester, 2-oxazolidone, imine type blocking agents such as ethylene imine, oxime type blocking agents such as formaldoxime, acetaldoxime, acetoxime, methylethyl ketoxime, diacetylomonoxime, benzophenoxime, cyclohexanonoxime and sulfurous acid salt type blocking agents such as sodium bisulfite, potassium bisulfite and the like.

In some embodiments, preferably the diisocyanate prepolymer, polyisocyanate prepolymer, or polyisocyanate oligomer is blocked with an aldehyde blocking agent such as 2-formyloxyethyl(meth)acrylate.

In some embodiments, preferably the reactive diluent of Part A comprises an acrylate, a methacrylate, a styrene, an acrylic acid, a vinylamide, a vinyl ether, a vinyl ester, acrylonitrile, styrene, divinyl benzene, vinyl toluene, methyl acrylate, ethyl acrylate, butyl acrylate, methyl (meth)acrylate, amine (meth)acrylates as well as their derivatives and combinations thereof.

In some embodiments, preferably the chain extender comprises at least one diol, diamine or dithiol chain extender selected from the group consisting of ethylene glycol, 1,3-propanediol, 1,2-propanediol, 1,4-butanediol, 1.5-pentanediol, 1.6-hexanediol, 1.7-heptanediol, 1,8-octanediol, 1.9-nonanediol, 1,10-decanediol, 1,11-undecanediol, 1,12-dodecanediol, 1.2-cyclohexanedimethanol, 1,4-cyclohexanedimethanol; the corresponding diamine and dithiol analogs thereof; lysine ethyl ester, arginine ethyl ester, p-alanine-based diamine, and random or block copolymers made from at least one diisocyanate and at least one diol, diamine or dithiol chain extender.

In some embodiments, preferably the polymerizable liquid comprises: from 5 or 20 or 40 percent by weight to 60 or 80 or 90 percent by weight of the blocked or reactive blocked prepolymer; from 10 or 20 percent by weight to 30 or 40 or 50 percent by weight of the reactive diluent; from 5 or 10 percent by weight to 20 or 30 percent by weight of the chain extender, and from 0.1 or 0.2 percent by weight to 1, 2 or 4 percent by weight of the photoinitiator. Optional additional ingredients, such as dyes, fillers, surfactants, etc., may also be included.

The polymerizable liquids having the amine composition of the invention provides sufficient stability and the mixture of components in the resin can be relatively stable and they can be formulated in advance eliminating the need to modify the apparatus to provide separate reservoirs and mixing capability.

During the thermal cure the blocking agent is cleaved and diisocyanate prepolymer is re-formed and quickly reacts with chain extenders or additional soft segment to form thermoplastic or thermoset polyurethane, polyurea or copolymer having both urea and urethane functionality.

An example of a dual cure resin is comprised of acrylo-based blocked polyurethane (ABPU) such as an UV-curable methacrylate blocked polyurethane, a reactive diluent, a photoinitiator, and chain extender. The function of the reactive diluent is to provide a UV-light polymerizable source (preferably 10-50 wt % of the mixture) such as an acrylate or methacrylate ester that helps to reduce the viscosity of the ABPU polymer or oligomer. The photoinitiator that is preferably present at about 1 wt % can be one of those commonly used UV initiators such as acetophenones (diethoxyacetophenone for example), phosphine oxides, diphenyl(2,4,6-trimethylbenzoyl)phosphine oxide, phenylbis(2,4,6-trimethylbenzoyl)phosphine oxide (PPO), Irgacure 369 and the like.

After UV curing to form an intermediate shaped product having blocked polyurethane oligomers as a scaffold, and carrying the chain extender, the ABPU resin is subjected to a thermal cure, during which a high molecular weight polyurethane/polyurea is formed by a spontaneous reaction between the blocked polyurethane/polyurea oligomers and the chain extender comprising the amine composition of the invention.

The component bearing the blocked isocyanate functionality that can comprise an isocyanate blocked polyurethane/polyurea prepolymer or oligomer can react with the chain extenders comprising the amine composition of the invention by either substitution or displacement of the blocking agent (preferably TBAEMA) during heating of the preformed object. The thermal cure time needed can vary depending on the temperature, size, shape, and density of the product, but is preferably between 1 to 6 hours depending on the specific ABPU systems, chain extenders and temperature.

Using sterically hindered amine-alcohols to block the terminal isocyanate functionalities of the polyurethane/polyurea prepolymer/oligomer allowed for the thermal displacement (deprotection) or displacement of the blocking agent at relatively mild temperatures in the range of about 100° C. allowing for the further polymerization of the Part B comprising the amine curing agents of the invention.

The amine curing agents of the invention can be used with other chain extenders such as diols, diamines, triols, triamines or their combinations or others such as ethylene glycol, 1,4-butanediol, methylene dicyclohexylamine (PACM as the commercial name from Evonik Corporation), hydroquinone bis(2-Hydroxyethyl) Ether (HQEE), 4.4-Methylenebis(3-Chloro-2,6-Diethylaniline) (MCDEA), 4,4'-methylene-bis-(2,6-diethylaniline) (MDEA), 4.4-Methylenebis(2-chloroaniline) (MOCA).

For the synthesis of an acrylo-blocked polyurethane/polyurea prepolymer TBAEMA may be used to block the isocyanate end groups of the prepolymer. The polyurethane prepolymer or oligomer can be prepared from polyols with preferably hydroxyl functionality of 2. The polyols can be polyethers especially polytetramethylene oxide (PTMO), polypropylene glycol (PPG), polyesters polycaprolactone (PCL), polycarbonate, polybutadiene diols, polybutadiene polyols. The molecular weight range of these polyols can be 500 to 6000 Daltons, and 500-2000 Daltons as preferred.

The polyurethane prepolymer or oligomers are preferably prepared by reacting an isocyanate such as diisocyanate such as toluene diisocyanate (TDI), methylene diphenyl diisocyanate (MDI), hexamethylene diisocyanate (HDI), isophorone diisocyanate (IPDI), hydrogenated MDI (HMDI), para-phenyldiisocyanate (PPDI) and the like with the polyol in the presence of a polyurethane catalyst such as stannous octoate at an isocyanate index of more than 100 and preferentially 200 or higher to ensure isocyanate terminal groups. Blocking of the terminal isocyanate is preferably accomplished by adding sufficient TBAEMA to cap the isocyanate functionalities as described in the examples section.

The objects produced using these methodology with the amine curing agent of the invention comprises (a) linear thermoplastic polyurethane, polyurea, or polyurethane/polyurea copolymer, (b) a cross-linked thermoset polyurethane, polyurea, or polyurethane/polyurea copolymer, or (c) combinations of (a) and (b) optionally blended with de-blocked blocking group which is copolymerized with the reactive diluents, forming an interpenetrating polymer network, a semi-interpenetrating polymer network or as a sequential interpenetrating polymer network.

The photoinitiator used to promote the radical polymerization of Part A may remain in the three dimensional formed object from 0.1 or 0.2 percent by weight to 1, 2 or 4 percent by weight or the photoinitiator may be present in lower amounts or only a trace amount or as fragments of the original photoinitiator structure.

In some example embodiments, the three-dimensional product may also include reacted photoinitiator fragments.

Unreactive blocking groups that do not participate in the light induced radical polymerization can also be used. Also, Part A of the resin can comprise non-blocked isocyanates. Furthermore, chain extenders such as triols, tetrols and polyols as well as triamines, tetraamines and polyamines can also be used.

During the thermal cure the blocking agent is cleaved and the chain extender poly-alcohol or poly-amine or both reacts to form the thermolastic or thermoset polyurethane, polyurea or a mixed polymer polyurethane/polyurea depending on the selection of chain extenders.

In some embodiments preferably the amine composition of the invention in Part B can be used combined with any type of diglycidyl ether and particularly di- and tri-glycidyl ethers that can anchor the amine, composition and optionally other functionalized tri-alkoxy-aminoalkyl-siloxane together with a silica precursor such as tetraethylorthosilicate (TEOS). Thus, once the free radical polymerization of Part A is completed the various components including silica and functionalized silica precursors can be completed in a second step by the incorporation of water and the addition of acid or by generating the acid in-situ by the action of light (photoacid generation).

In some embodiments, preferably other components such as phenolic resins (phenolic resoles or novolacs), polyimides (made from dianhydrides or diacids and diimines) as well as derivatives of natural products such as glycerol, natural oil polyols and the like which can be included with or without the presence of solvents or diluent.

In some embodiments, preferably silicone or poly(dimethylsiloxane) (PDMS) may be used as soft segment in the formation of these materials. For example, a (meth)acrylate-functional ABPU could be formed by first reacting an oligomeric PDMS diol or diamine with two equivalents of diisocyanate to form a PDMS urethane prepolymer. This material can be further reacted with TBAEMA or other reactive blocking agents described herein to form a reactive blocked PDMS prepolymer which could be blended with chain extenders and reactive diluents as described in the examples section.

In some embodiments, preferably the material may comprise, consist of or consist essentially of a UV-curable PDMS oligomer that is blended with a two-part thermally curable PDMS oligomer system.

In some embodiments, preferably a photopolymerization will undergo transformation in which UV light cleaves the initiator into active radical fragments. These active radical fragments will go on to react with monomer. During the propagation step, the active monomer will react with additional monomers that attach to the growing polymer chain. Finally, termination can occur either by recombination or by disproportionation.

In some embodiments, photoinitiators may preferably include the following:

(a) Benzoyl-chromophore based compounds such as (IV)

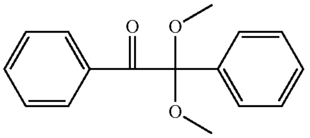

(b) Morpholine amino ketones such as:

(V)

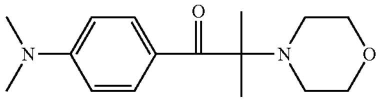

(c) Benzoyl phosphine oxides such as:

(VI)

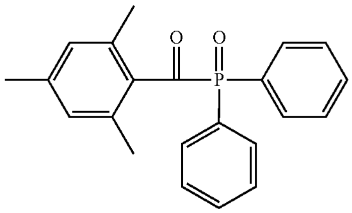

(d) Amines: many photoinitiators may be used in combination with amines. In this case the photoinitiators in the excited state serve to abstract a hydrogen atom from the amine, thus generating an active radical. This radical can go on to initiate polymerization and will therefore become incorporated into the formed polymer network.

(e) Other systems: these types of photoinitiators that may be used to generate such materials and therefore will generate fragments which are covalently attached to the formed polymer network include: triazines, ketones, peroxides, diketones, azides, azo derivatives, disulfide derivatives, disilane derivatives, thiol derivatives, diselenide derivatives, diphenylditelluride derivatives, digermane derivatives, distannane derivatives, carob-germanium compounds, carbon-silicon derivatives, sulfur-carbon derivatives, sulfur-silicon derivatives, peresters, Barton's ester derivatives, hydroxamic and thiohydroxamic acids and esters, organoborates, organometallic compounds, titanocenes, chromium complexes, alumate complexes, carbon-sulfur or sulfur-sulfur compounds, oxyamines, aldehydes, acetals, silanes, phosphorous-containing compounds, borane complexes, thioxanthone derivatives, coumarins, anthraquinones, fluorenones, ferrocenium salts.

In some embodiments of the method, preferably the light that passes through the radiation-transparent window to form a solid scaffold object is an ultraviolet light.

The amine composition of the invention can be used in any type of 3D printing manufacturing method that requires a second solidifiable component of the dual cure systems to essentially 3D print an unlimited number of products such as medical devices and implantable medical devices such as stents, drug delivery depots, catheters, bladders, breast implants, testicle implants, pectoral implants, eye implants, contact lenses, dental aligners, microfluidics, seals, shrouds, and other applications requiring high biocompatibility, functional structures, microneedle arrays, fibers, rods, wave guides, micromechanical devices, microfluidic devices; fasteners; electronic device housings; gears, propellers, and impellers; wheels, mechanical device housings; tools; structural elements; hinges including living hinges; boat and watercraft hulls and decks; wheels; bottles, jars and other containers; pipes, liquid tubes and connectors; foot-ware soles, heels, innersoles and midsoles; bushings, o-rings and gaskets; shock absorbers, funnel/hose assembly, cushions; electronic device housings; shin guards, athletic cups, knee pads, elbow pads, foam liners, padding or inserts, helmets, helmet straps, head gear, shoe cleats, gloves, other wearable or athletic equipment, brushes, combs, rings, jewelry, buttons, snaps, fasteners, watch bands or watch housings, mobile phone or tablet casings, computer key boards or keyboard buttons or components, remote control buttons or components, auto dashboard components, buttons, dials, auto body parts, paneling, other automotive, aircraft or boat parts, cookware, bakeware, kitchen utensils, steamers and any number of other 3D objects.

Preferred items of the invention are the following items 1 to 25.

Item 1. Use of an amine composition for preparing an object by a 3D printing process based on dual polymerization, wherein the amine composition comprises at least one amine curing agent with the structure:

(I)

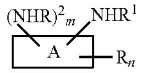

where R is H or a $C_{1-6}$ linear or branched alkyl; where A represents a $C_{6-20}$ cyclic, polycyclic or acyclic linear or branched polyamine; where each of $R^1$ and $R^2$ is H, a $C_{1-9}$ linear or branched alkyl substituent, a cyclic substituent having a heteroatom, or an aromatic substituent; and where n=1 to 6 and where m=1 to 3.

Item 2. The use of item 1 wherein the amine composition comprises at least one amine curing agent with the structure:

(I)

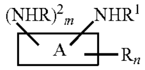

where R is H or a $C_{1-6}$ linear or branched alkyl; where A represents a $C_{6-20}$ cyclic, polycyclic or acyclic linear or branched polyamine; where $R^1$ and $R^2$ are H; where n=1 to 6 and where m=1 to 3.

Item 3. The use of item 2 wherein the at least one amine curing agent has the structure:

(II)

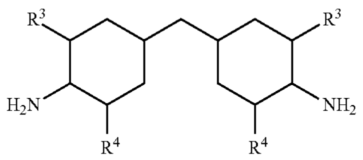

where $R^3$ is H and $R^4$ is a $C_{2-6}$ saturated alkyl linear or branched or where $R^3$=$R^4$=$C_{1-6}$ saturated alkyl linear or branched.

Item 4 The use of item 3 wherein the at least one amine curing agent is selected from the group consisting of 4,4'-methylenebis(2-ethylcyclohexylamine), 4,4'-methylenebis(2-(n-propyl)cyclohexylamine), 4,4'-methylenebis(2-(sec-propyl)cyclohexylamine), 4,4'-methylenebis(2-(n-butyl)cyclohexylamine), 4,4'-methylenebis(2-(sec-butyl)cyclohexylamine), 4,4'-methylenebis(2-(iso-butyl)cyclohexylamine), 4,4'-methylenebis(2-(t-butyl)cyclohexylamine), 4,4'-methylenebis(2-(n-pentyl)cyclohexylamine), 4,4'-methylenebis(2-(tert-pentyl)

cyclohexylamine), 4,4'-methylenebis(2-(neo-pentyl)cyclohexylamine), 4,4'-methylenebis(2-(iso-pentyl)cyclohexylamine), 4,4'-methylenebis(2-(sec-pentyl) cyclohexylamine), 4,4'-methylenebis(2-(3-pentyl) cyclohexylamine), 4,4'-methylenebis(2-(sec-isopentyl) cyclohexylamine), 4,4'-methylenebis(2-(n-hexyl) cyclohexylamine), 4,4'-methylenebis(2-(2-hexyl) cyclohexylamine), 4,4'-methylenebis(2-(3-hexyl) cyclohexylamine), 4,4'-methylenebis(2-(neo-hexyl) cyclohexylamine), 4,4'-methylenebis(2-(isohexyl) cyclohexylamine), 4,4'-methylenebis(2-(4-methylpent yl)cyclohexylamine), 4,4'-methylenebis(2-(4-methylpent-2-yl)cyclohexylamine), 4,4'-methylenebis(2-(2-methylpent-2-yl)cyclohexylamine), 4,4'-methylenebis(2-(2-methylpent-1-yl)cyclohexylamine), 4,4'-methylenebis(2,6-dimethylcyclohexylamine), 4,4'-methylenebis(2,6-diethylcyclohexylamine), 4,4'-methylenebis(2,6-di(n-propyl)cyclohexylamine), 4,4'-methylenebis(2,6-di(sec-propyl)cyclohexylamine), 4,4'-methylenebis(2,6-di(n-butyl) cyclohexylamine), 4,4'-methylenebis(2,6-di(sec-butyl) cyclohexylamine), 4,4'-methylenebis(2,6-di(iso-butyl) cyclohexylamine), 4,4'-methylenebis(2,6-di(t-butyl) cyclohexylamine), 4,4'-methylenebis(2,6-di(n-pentyl) cyclohexylamine), 4,4'-methylenebis(2,6-di(tert-pentyl) cyclohexylamine), 4,4'-methylenebis(2,6-di(neo-pentyl) cyclohexylamine), 4,4'-methylenebis(2,6-di(iso-pentyl) cyclohexylamine), 4,4'-methylenebis(2,6-di(sec-pentyl) cyclohexylamine), 4,4'-methylenebis(2,6-di(3-pentyl) cyclohexylamine), 4,4'-methylenebis(2,6-di(sec-isopentyl) cyclohexylamine), 4,4'-methylenebis(2,6-di(n-hexyl) cyclohexylamine), 4,4'-methylenebis(2,6-di(2-hexyl) cyclohexylamine), 4,4'-methylenebis(2,6-di(3-hexyl) cyclohexylamine), 4,4'-methylenebis(2,6-di(neo-hexyl) cyclohexylamine), 4,4'-methylenebis(2,6-di(isohexyl) cyclohexylamine), 4,4'-methylenebis(2,6-di(4-methylpent-1-yl)cyclohexylamine), 4,4'-methylenebis(2,6-di(4-methylpent-2-yl)cyclohexylamine), 4,4'-methylenebis(2,6-di(2-methylpent-2-yl)cyclohexylamine), and 4,4'-methylenebis(2,6-di(2-methylpent-1-yl)cyclohexylamine).

Item 5. The use of item 1 wherein the amine composition comprises at least one amine curing agent with the structure:

(I)

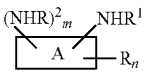

where R is H or a $C_{1-3}$ linear or branched alkyl; where A represents a $C_{6-20}$ cyclic, polycyclic or acyclic linear or branched polyamine; where $R^1$ and $R^2$ are a $C_{1-9}$ linear or branched alkyl substituent, a cyclic substituent having a heteroatom, or an aromatic substituent; and where n=1 to 6 and where m=1 to 3.

Item 6. The use of item 5 wherein the at least one amine curing agent is selected from the group consisting of N,N'-dialkylated 4,4-diaminodicyclohexylmethane, N,N'-dialkylated isophoronediamine, N,N'-dialkylated 4,4'-methylenebis(2-methylcyclohexylamine), N,N'-dialkylated 4-methylcyclohexane-1,3-diamine, N,N'-dialkylated ethylenediamine, N,N'-dialkylated propylene diamine, N,N'-dialkylated 1,4-butanediamine, N,N'-dialkylated 1,5-pentanediamine, N,N'-dialkylated 1,6-hexanediamine, N,N'-dialkylated 4-(aminomethyl)octane-1,8-diamine, N,N'-dialkylated 1,8-octyldiamine, N,N',N"-trialkylated 4-(aminomethyl)octane-1,8-diamine, N,N',N"-triialkylated tris(2-aminoethyl)amine, tris(3-aminopropyl)amine, and mixtures thereof; wherein the alkyl group is selected from the group consisting of methyl, ethyl, propyl, isopropyl, butyl, sec-butyl, isobutyl, pentyl, neopentyl, isopentyl, sec-pentyl, sec-isopentyl, 4-methylpent-2-yl and 2,2,6,6-tetramethylpiperidine-4yl.

Item 7. The use of item 2 wherein the amine composition comprises the reaction product of i) at least one amine curing agent with the structure:

(III)

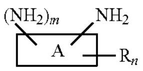

where R is H or a $C_{1-6}$ linear or branched alkyl, where A represents a $C_{6-20}$ cyclic, polycyclic or acyclic linear or branched polyamine, where n=1 to 6 and where m=1 to 3, with ii) at least one α,β-unsaturated carboxylic ester.

Item 8. The use of item 7 wherein the amine composition comprises the reaction product of i) 4,4-diaminodicyclohexylmethane or 4,4'-methylenebis(2-methylcyclohexylamine or 4,4'-methylenebis(2-ethylcyclohexylamine), or 4,4'-methylenebis(2-(n-propyl)cyclohexylamine), or 4,4'-methylenebis(2-(sec-propyl)cyclohexylamine), or 4,4'-methylenebis(2-(n-butyl)cyclohexylamine), or 4,4'-methylenebis(2-(sec-butyl)cyclohexylamine), or 4,4'-methylenebis(2-(iso-butyl)cyclohexylamine), or 4,4'-methylenebis(2-(t-butyl) cyclohexylamine), or 4,4'-methylenebis(2-(n-pentyl) cyclohexylamine), or 4,4'-methylenebis(2-(tert-pentyl) cyclohexylamine), or 4,4'-methylenebis(2-(neo-pentyl) cyclohexylamine), or 4,4'-methylenebis(2-(iso-pentyl) cyclohexylamine), or 4,4'-methylenebis(2-(sec-pentyl) cyclohexylamine), or 4,4'-methylenebis(2-(3-pentyl) cyclohexylamine), or 4,4'-methylenebis(2-(sec-isopentyl) cyclohexylamine), or 4,4'-methylenebis(2-(n-hexyl) cyclohexylamine), or 4,4'-methylenebis(2-(2-hexyl) cyclohexylamine), or 4,4'-methylenebis(2-(3-hexyl) cyclohexylamine), or 4,4'-methylenebis(2-(neo-hexyl) cyclohexylamine), or 4,4'-methylenebis(2-(isohexyl) cyclohexylamine), or 4,4'-methylenebis(2-(4-methylpent yl)cyclohexylamine), or 4,4'-methylenebis(2-(4-methyl-pent-2-yl)cyclohexylamine), or 4,4'-methylenebis(2-(2-methylpent-2-yl)cyclohexylamine), or 4,4'-methylenebis(2-(2-methylpent-1-yl)cyclohexylamine), or 4,4'-methylenebis (2,6-dimethylcyclohexylamine), or 4,4'-methylenebis(2,6-diethylcyclohexylamine), or 4,4'-methylenebis(2,6-di(n-propyl)cyclohexylamine), or 4,4'-methylenebis(2,6-di(sec-propyl)cyclohexylamine), or 4,4'-methylenebis(2,6-di(n-butyl)cyclohexylamine), or 4,4'-methylenebis(2,6-di(sec-butyl)cyclohexylamine), or 4,4'-methylenebis(2,6-di(iso-butyl)cyclohexylamine), or 4,4'-methylenebis(2,6-di(t-butyl)cyclohexylamine), or 4,4'-methylenebis(2,6-di(n-pentyl)cyclohexylamine), or 4,4'-methylenebis(2,6-di(tert-pentyl)cyclohexylamine), or 4,4'-methylenebis(2,6-di(neo-pentyl)cyclohexylamine), or 4,4'-methylenebis(2,6-di(iso-pentyl)cyclohexylamine), or 4,4'-methylenebis(2,6-di(sec-pentyl)cyclohexylamine), or 4,4'-methylenebis(2,6-di(3-pentyl)cyclohexylamine), or 4,4'-methylenebis(2,6-di(sec-isopentyl)cyclohexylamine), or 4,4'-methylenebis(2,6-di(n-hexyl)cyclohexylamine), or 4,4'-methylenebis(2,6-di(2-hexyl)cyclohexylamine), or 4,4'-methylenebis(2,6-di(3-hexyl)cyclohexylamine), or 4,4'-methylenebis(2,6-di(neo-hexyl)cyclohexylamine), or 4,4'-methylenebis(2,6-di (isohexyl)cyclohexylamine), or 4,4'-methylenebis(2,6-di(4- methylpent-1-yl)cyclohexylamine), or 4,4'-methylenebis(2,6-di(4-methylpent-2-yl)cyclohexylamine), or 4,4'-methylenebis(2,6-di(2-methylpent-2-yl)cyclohexylamine), or 4,4'-methylenebis(2,6-di(2-methylpent-1-yl)cyclohexylamine or 4-methylcyclohexane-1,3-diamine (MCHD) or ethylenediamine (EDA) or propylene diamine (PDA) or 1,4-butanediamine (BDA), or 1,5-pentanediamine (PeDA) or 1,6-hexanediamine (HMDA) or 4-(aminomethyl)octane-1,8-diamine, or 1,8-octyldiamine or any mixture thereof with ii) methylacrylate, ethylacrylate, propylacrylate, butylacrylate, pentylacrylate, hexylacrylate, dimethylmaleate, diethylmaleate, dipropylmaleate, dibutylmaleate, dipentylmaleate, dihexylmaleate dimethylfumarate, diethylfumarate, dipropylfumarate, dibutylfumarate, dipentylfumarate, dihexylfumarate or any mixture thereof.

Item 9. A method of forming a three-dimensional object comprising the following steps: a) getting in contact in an optically transparent build surface a polymerizable liquid in the presence of at least one of a reactive diluent, photoinitiator, and chain extender, wherein the polymerizable liquid comprises at least one of i) a monomer, ii) a blocked or reactive blocked oligomer or iii) a blocked or reactive blocked prepolymer; b) irradiating the build surface with light that passes through a radiation-transparent window to form a solid scaffold object; c) heating or microwaving the solid scaffold object to induce the polymerization of the at least one of a monomer, a blocked or reactive blocked oligomer or a blocked or reactive blocked prepolymer with an amine composition to form the three-dimensional object, wherein the amine composition comprises at least one amine curing agent with the structure:

(I)

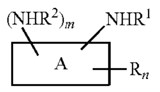

where R is H or a $C_{1-6}$ linear or branched alkyl; where A represents a $C_{6-20}$ cyclic, polycyclic or acyclic linear or branched polyamine; where each of $R^1$ and $R^2$ is H, a $C_{1-9}$ linear or branched alkyl substituent, a cyclic substituent having a heteroatom, or an aromatic substituent; and where n=1 to 6 and where m=1 to 3.

Item 10. The method of item 9 wherein the amine composition comprises at least one amine curing agent with the structure:

(I)

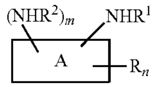

where R is H or a $C_{1-6}$ linear or branched alkyl; where A represents a $C_{6-20}$ cyclic, polycyclic or acyclic linear or branched polyamine; where $R^1$ and $R^2$ are H; where n=1 to 6 and where m=1 to 3.

Item 11. The method of item 10 wherein the amine composition comprises at least one amine curing agent with the structure:

(II)

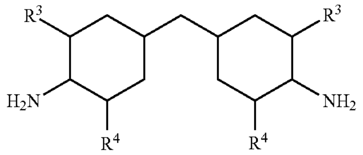

where $R^3$ is H and $R^4$ is $C_{2-6}$ saturated alkyl linear or branched or where $R^3$=$R^4$=$C_{1-6}$ saturated alkyl linear or branched.

Item 12. The method of item 11 wherein the at least one amine curing agent is selected from the group consisting 4,4'-methylenebis(2-ethylcyclohexylamine), 4,4'-methylenebis(2-(n-propyl)cyclohexylamine), 4,4'-methylenebis(2-(sec-propyl)cyclohexylamine), 4,4'-methylenebis(2-(n-butyl)cyclohexylamine), 4,4'-methylenebis(2-(sec-butyl) cyclohexylamine), 4,4'-methylenebis(2-(iso-butyl) cyclohexylamine), 4,4'-methylenebis(2-(t-butyl) cyclohexylamine), 4,4'-methylenebis(2-(n-pentyl) cyclohexylamine), 4,4'-methylenebis(2-(tert-pentyl) cyclohexylamine), 4,4'-methylenebis(2-(neo-pentyl) cyclohexylamine), 4,4'-methylenebis(2-(iso-pentyl) cyclohexylamine), 4,4'-methylenebis(2-(sec-pentyl) cyclohexylamine), 4,4'-methylenebis(2-(3-pentyl) cyclohexylamine), 4,4'-methylenebis(2-(sec-isopentyl) cyclohexylamine), 4,4'-methylenebis(2-(n-hexyl) cyclohexylamine), 4,4'-methylenebis(2-(2-hexyl) cyclohexylamine), 4,4'-methylenebis(2-(3-hexyl) cyclohexylamine), 4,4'-methylenebis(2-(neo-hexyl) cyclohexylamine), 4,4'-methylenebis(2-(isohexyl) cyclohexylamine), 4,4'-methylenebis(2-(4-methylpent-1-yl) cyclohexylamine), 4,4'-methylenebis(2-(4-methylpent-2-yl) cyclohexylamine), 4,4'-methylenebis(2-(2-methylpent-2-yl) cyclohexylamine), 4,4'-methylenebis(2-(2-methylpent-1-yl) cyclohexylamine), 4,4'-methylenebis(2,6-dimethylcyclohexylamine), 4,4'-methylenebis(2,6-diethylcyclohexylamine), 4,4'-methylenebis(2,6-di(n-propyl)cyclohexylamine), 4,4'-methylenebis(2,6-di(sec-propyl)cyclohexylamine), 4,4'-methylenebis(2,6-di(n-butyl) cyclohexylamine), 4,4'-methylenebis(2,6-di(sec-butyl) cyclohexylamine), 4,4'-methylenebis(2,6-di(iso-butyl) cyclohexylamine), 4,4'-methylenebis(2,6-di(t-butyl) cyclohexylamine), 4,4'-methylenebis(2,6-di(n-pentyl) cyclohexylamine), 4,4'-methylenebis(2,6-di(tert-pentyl) cyclohexylamine), 4,4'-methylenebis(2,6-di(neo-pentyl) cyclohexylamine), 4,4'-methylenebis(2,6-di(iso-pentyl) cyclohexylamine), 4,4'-methylenebis(2,6-di(sec-pentyl) cyclohexylamine), 4,4'-methylenebis(2,6-di(3-pentyl) cyclohexylamine), 4,4'-methylenebis(2,6-di(sec-isopentyl) cyclohexylamine), 4,4'-methylenebis(2,6-di(n-hexyl) cyclohexylamine), 4,4'-methylenebis(2,6-di(2-hexyl) cyclohexylamine), 4,4'-methylenebis(2,6-di(3-hexyl) cyclohexylamine), 4,4'-methylenebis(2,6-di(neo-hexyl) cyclohexylamine), 4,4'-methylenebis(2,6-di(isohexyl) cyclohexylamine), 4,4'-methylenebis(2,6-di(4-methylpent-1-yl)cyclohexylamine), 4,4'-methylenebis(2,6-di(4-methylpent-2-yl)cyclohexylamine), 4,4'-methylenebis(2,6-di(2-methylpent-2-yl)cyclohexylamine), and 4,4'-methylenebis(2,6-di(2-methylpent-1-yl)cyclohexylamine).

Item 13. The method of item 9 wherein the amine composition comprises at least one amine curing agent with the structure:

(I)

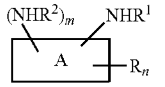

where R is H or a $C_{1-3}$ linear or branched alkyl; where A represents a $C_{6-20}$ cyclic, polycyclic or acyclic linear or branched polyamine; where $R^1$ and $R^2$ are a $C_{1-9}$ linear or branched alkyl substituent, a cyclic substituent having a heteroatom, or an aromatic substituent; and where n=1 to 6 and where m=1 to 3.

Item 14. The method of item 13 wherein the at least one amine curing agent is selected from the group consisting of N,N'-dialkylated 4,4-diaminodicyclohexylmethane, N,N'-dialkylated isophoronediamine, N,N'-dialkylated 4,4'-methylenebis(2-methylcyclohexylamine), N,N'-dialkylated 4-methylcyclohexane-1,3-diamine, N,N'-dialkylated ethylenediamine, N,N'-dialkylated propylene diamine, N,N'-dialkylated 1,4-butanediamine, N,N'-dialkylated 1,5-pentanediamine, N,N'-dialkylated 1,6-hexanediamine, N,N'-dialkylated 4-(aminomethyl)octane-1,8-diamine, N,N'-dialkylated 1,8-octyldiamine, N,N',N"-trialkylated 4-(aminomethyl)octane-1,8-diamine, N,N',N"-triialkylated tris(2-aminoethyl)amine, tris(3-aminopropyl)amine, and mixtures thereof; wherein the alkyl group is selected from the group consisting of methyl, ethyl, propyl, isopropyl, butyl, sec-butyl, isobutyl, pentyl, neopentyl, isopentyl, sec-pentyl, sec-isopentyl, 4-methylpent-2-yl and 2,2,6,6-tetramethylpiperidine-4yl.

Item 15. The method of item 10 wherein the amine composition comprises the reaction product of i) at least one amine curing agent with the structure:

(III)

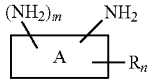

where R is H or a $C_{1-6}$ linear or branched alkyl, where A represents a $C_{6-20}$ cyclic, polycyclic or acyclic linear or branched polyamine, where n=1 to 6 and where m=1 to 3, with ii) at least one α,β-unsaturated carboxylic ester.

Item 16. The method of item 15 wherein the amine composition comprises the reaction product of i) 4,4-diaminodicyclohexylmethane or 4,4'-methylenebis(2-methylcyclohexylamine or 4,4'-methylenebis(2-ethylcyclohexylamine), or 4,4'-methylenebis(2-(n-propyl)cyclohexylamine), or 4,4'-methylenebis(2-(sec-propyl)cyclohexylamine), or 4,4'-methylenebis(2-(n-butyl)cyclohexylamine), or 4,4'-methylenebis(2-(sec-butyl)cyclohexylamine), or 4,4'-methylenebis (2-(iso-butyl)cyclohexylamine), or 4,4'-methylenebis(2-(t-butyl)cyclohexylamine), or 4,4'-methylenebis(2-(n-pentyl) cyclohexylamine), or 4,4'-methylenebis(2-(tert-pentyl) cyclohexylamine), or 4,4'-methylenebis(2-(neo-pentyl) cyclohexylamine), or 4,4'-methylenebis(2-(iso-pentyl) cyclohexylamine), or 4,4'-methylenebis(2-(sec-pentyl) cyclohexylamine), or 4,4'-methylenebis(2-(3-pentyl) cyclohexylamine), or 4,4'-methylenebis(2-(sec-isopentyl) cyclohexylamine), or 4,4'-methylenebis(2-(n-hexyl) cyclohexylamine), or 4,4'-methylenebis(2-(2-hexyl) cyclohexylamine), or 4,4'-methylenebis(2-(3-hexyl) cyclohexylamine), or 4,4'-methylenebis(2-(neo-hexyl) cyclohexylamine), or 4,4'-methylenebis(2-(isohexyl) cyclohexylamine), or 4,4'-methylenebis(2-(4-methylpent-1-yl)cyclohexylamine), or 4,4'-methylenebis(2-(4-methylpent-2-yl)cyclohexylamine), or 4,4'-methylenebis(2-(2-methylpent yl)cyclohexylamine), or 4,4'-methylenebis(2-(2-methylpent-1-yl)cyclohexylamine), or 4,4'-methylenebis(2,6-dimethylcyclohexylamine), or 4,4'-methylenebis(2,6-diethylcyclohexylamine), or 4,4'-methylenebis(2,6-di(n-propyl)cyclohexylamine), or 4,4'-methylenebis(2,6-di(sec-propyl)cyclohexylamine), or 4,4'-methylenebis(2,6-di(n-butyl)cyclohexylamine), or 4,4'-methylenebis(2,6-di(sec-butyl)cyclohexylamine), or 4,4'-methylenebis(2,6-di(iso-butyl)cyclohexylamine), or 4,4'-methylenebis(2,6-di(t-butyl)cyclohexylamine), or 4,4'-methylenebis(2,6-di(n-pentyl)cyclohexylamine), or 4,4'-methylenebis(2,6-di(tert-pentyl)cyclohexylamine), or 4,4'-methylenebis(2,6-di(neo-pentyl)cyclohexylamine), or 4,4'-methylenebis(2,6-di(iso-pentyl)cyclohexylamine), or 4,4'-methylenebis(2,6-di(sec-pentyl)cyclohexylamine), or 4,4'-methylenebis(2,6-di(3-pentyl)cyclohexylamine), or 4,4'-methylenebis(2,6-di(sec-isopentyl)cyclohexylamine), or 4,4'-methylenebis(2,6-di(n-hexyl)cyclohexylamine), or 4,4'-methylenebis(2,6-di(2-hexyl)cyclohexylamine), or 4,4'-methylenebis(2,6-di(3-hexyl)cyclohexylamine), or 4,4'-methylenebis(2,6-di(neo-hexyl)cyclohexylamine), or 4,4'-methylenebis(2,6-di (isohexyl)cyclohexylamine), or 4,4'-methylenebis(2,6-di(4-methylpent-1-yl)cyclohexylamine), or 4,4'-methylenebis(2,6-di(4-methylpent-2-yl)cyclohexylamine), or 4,4'-methylenebis(2,6-di(2-methylpent-2-yl)cyclohexylamine), or 4,4'-methylenebis(2,6-di(2-methylpent-1-yl)cyclohexylamine or 4-methylcyclohexane-1,3-diamine (MCHD) or ethylenediamine (EDA) or propylene diamine (PDA) or 1,4-butanediamine (BDA), or 1,5-pentanediamine (PeDA) or 1,6-hexanediamine (HMDA) or 4-(aminomethyl)octane-1,8-diamine, or 1,8-octyldiamine or any mixture thereof with ii) methylacrylate, ethylacrylate, propylacrylate, butylacrylate, pentylacrylate, hexylacrylate, dimethylmaleate, diethylmaleate, dipropylmaleate, dibutylmaleate, dipentylmaleate, dihexylmaleate dimethylfumarate, diethylfumarate, dipropylfumarate, dibutylfumarate, dipentylfumarate, dihexylfumarate or any mixture thereof.

Item 17 The method of any of items 9-16 wherein the blocked or reactive blocked prepolymer comprises at least one of a diisocyanate prepolymer, a polyisocyanate prepolymer, and a polyisocyanate oligomer.

Item 18. The method of item 17 wherein the blocked or reactive blocked prepolymer comprises a diisocyanate prepolymer or polyisocyanate prepolymer made by the condensation of an isocyanate or polyisocyanate with a polyol or a polyamine or a combination of both to make a polyurethane or a polyurea on a polyurethane/polyurea prepolymer that is terminated with isocyanate functionality.

Item 19. The method of item 17 wherein the blocked or reactive blocked prepolymer comprises a polyisocyanate oligomer produced by the reaction of at least one diisocyanate with at least one polyol.

Item 20. The method of item 17 wherein the reactive blocked prepolymer is blocked by reaction of a polyisocyanate with a blocking agent selected from the group consisting of 2-(tert-butylamino)ethyl methacrylate, 2-(tert-pentylamino) ethyl methacrylate, 2-(tert-hexylamino)ethylmethacrylate, 3-(tert-butylamino)propyl methacrylate, and mixtures thereof.

Item 21. The method of item 17 wherein the diisocyanate prepolymer, polyisocyanate prepolymer, or polyisocyanate oligomer is blocked with 2-formyloxyethyl(meth)acrylate.

Item 22. The method of any of items 9-21 wherein the reactive diluent comprises an acrylate, a methacrylate, a styrene, an acrylic acid, a vinylamide, a vinyl ether, a vinyl ester, acrylonitrile, styrene, divinyl benzene, vinyl toluene, methyl acrylate, ethyl acrylate, butyl acrylate, methyl (meth) acrylate, amine (meth)acrylates as well as their derivatives and combinations thereof.

Item 23. The method of any of items 9-21 wherein the chain extender comprises at least diol, diamine or dithiol selected from the group consisting of ethylene glycol, 1,3-propanediol, 1,2-propanediol, 1,4-butanediol, 1.5-pentanediol, 1.6-hexanediol, 1.7-heptanediol, 1,8-octanediol, 1.9-nonanediol, 1,10-decanediol, 1,11-undecanediol, 1,12-dodecanediol, 1.2-cyclohexanedimethanol, 1,4-cyclohexanedimethanol; the corresponding diamine and dithiol analogs thereof; lysine ethyl ester, arginine ethyl ester, p-alanine-based diamine, and random or block copolymers made from at least one diisocyanate and at least one diol, diamine or dithiol.

Item 24. The method of any of items 9-21 wherein the photoinitiator is a benzoyl-chromophore based compound, a morpholine amino ketone, or a benzoyl phosphine oxide.

Item 25. The method of any of items 9-21 wherein the light is an ultraviolet light.

Example 1

General Scope

These examples are provided to demonstrate certain aspects of the invention and shall not limit the scope of the claims appended hereto. The polymers produced were essentially flexible polyurethane based materials (FPU) and elastomeric polyurethane material (EPU).

Example 2

Synthesis of Acrylate Blocked Polyurethane Prepolymer for the Resin Side

A procedure for producing an acrylate-blocked polyurethane prepolymer can be prepared using the following procedure. The prepolymer used was a commercially available product from COIM, Inc. known as IMUTHANE®APC-504 made from isophorone-diisocyanate and PTMEG (polytetramethylene glycol) having an equivalent weight of 506 equivalent/mol. Thus, IMUTHANE®APC-504 (375.7 g, 354 mmol) was added to a reaction vessel equipped with a mechanical stirrer, a dropping funnel and a condenser under nitrogen. Isobornyl methacrylate (352 g) was added next and the mixture was mechanically mixed until a uniform and homogeneous liquid was observed. Once the prepolymer was dissolved, the blocking agent, tert-butylamino-ethylmethacrylate (131 g, 708 mmol), was added drop-wise to the reaction vessel and the reaction was stirred for another 60 minutes and its progress was monitored by ATR-FTIR (Attenuated Total Reflection-FTIR). The absence of isocyanate absorption band at approximately 2260 $cm^{-1}$ indicated a complete consumption of isocyanate and reaction completion. The concentration of the acrylic-blocked polyurethane prepolymer in isobornyl methacrylate diluent was about 59%.

Example 3

Synthesis of Curing Agents

An aliphatic curing agent was prepared from 4,4'-methylene-bis(2,6-diethylaniline) by catalytic hydrogenation. Thus, a stainless steel reactor was loaded with a 40 wt. % solution of 4,4'-methylene-bis(2,6-diethylaniline) and a mixture of catalyst made of 3 wt. % of 5 wt. % Ru on lithium-aluminate, 3 wt. % of 4 wt. % Rh on lithium-aluminate. The reactor was purged with nitrogen, then with hydrogen and the temperature was increased to 180° C. Hydrogen pressure was increased to about 800 psig. The reaction was continued until hydrogenation uptake was completed to yield upon catalyst filtration a THF solution of primarily 4,4'-methylene-bis(2,6-diethylcyclohexylamine). Upon THF removal by rotary evaporation the yield of 4,4'-methylene-bis(2,6-diethylcyclohexylamine) was approximately 96% obtained as a light amber liquid.

Example 4

Synthesis of Curing Agents

Another aliphatic curing agent was prepared from 4,4'-methylene-bis(2,6-diethylaniline) by catalytic hydrogenation. Thus, a stainless steel reactor was loaded with a 40 wt. % solution of 4,4'-methylene-bis(2,6-diisopropylaniline) and a mixture of catalyst made of 3 wt. % of 5 wt. % Ru on lithium-aluminate, 3 wt. % of 4 wt. % Rh on lithium-aluminate. The reactor was purged with nitrogen, then with hydrogen and the temperature was increased to 180° C. Hydrogen pressure was increased to about 800 psig. The reaction was continued until hydrogenation uptake was completed to yield upon catalyst filtration a THF solution of primarily 4,4'-methylene-bis(2,6-diisopropylcyclohexylamine). Upon THF removal by rotary evaporation the yield of 4,4'-methylene-bis(2,6-diisopropylcyclohexylamine) was approximately 98% obtained as a light orange liquid.

Example 5

Amine Curing Testing of Acrylic-Blocked Isocyanate-Based Prepolymers

Tests to assess the gelling performance of the different curing agents were performed at an isocyanate/amine index of 1.0 meaning that an equal number of equivalents of amine and blocked-isocyanate were combined and reacted. A procedure for the isocyanate-blocked polyurethane prepolymer reaction with 4,4'-methylene-bis(2-methylcyclohexylamine) is described. The 59 wt. % solution of acrylo-blocked polyurethane prepolymer in isobornyl methacrylate prepared in example 2 (18.2 g, equivalent weight=1214.2 g/eq) was mixed with a high shear speed (2000 rpm) for 40 seconds with 1.79 g of 4,4'-methylene-bis(2-methylcyclohexylamine) (equivalent weight=119 eq/eq). Approximately 18 g of this mixture was added to a receiving container and placed in the viscometer into the thermocel chamber preheated to 40° C. The spindle of the viscometer was lowered and centered in the chamber, and the test was started. As the resin heats to 40° C. the viscosity decreased until it levels off and then began to increase until the endpoint of the test. The initial viscosity ($\eta_i$) of the experiment was chosen after 30 mins after the test had begun from the lowest value during heating. A similar procedure was also followed to monitor the viscosity changes over time with the curing agents of example 3 and example 4.

TABLE I

Time Required for Viscocity to Double From Initial Value for Various Curing Agents

| Curing Agent | $\eta_i$ (cP) | $\eta_f$ (cP) | Time (hours) |
|---|---|---|---|
| 4,4'-methylene-bis(cyclohexylamine) | 1200 | 2400 | 11.3 |
| 4,4'-methylene-bis(2-methylcyclohexylamine) | 1000 | 2000 | 13.3 |
| 4,4'-methylene-bis(2,6-dimethylcyclohexylamine) | 1200 | 2400 | 14.5 |
| 4,4'-methylene-bis(2,6-diethylcyclohexylamine) | 1200 | 2400 | 17.5 |
| 4,4'-methylene-bis(2,6-diisopropylcyclohexylamine) | 1400 | 2800 | 19.8 |
| Isophoronediamine | 900 | 1800 | 10.4 |
| N,N''-diisopropylisophorone diamine | 960 | 1750 | 49.0 |
| 4,4'-methylene-bis(N(sec-butyl)-cyclohexylamine) | 950 | 1800 | 39.5 |

Table I shows that increasing the steric hindrance in the vicinal carbon-atom results in longer time for the resin to cure. Also, increasing steric hindrance results in an overall decrease of the viscosity of the resin-curative mixture.

Example 6

Evaluation of the Physical Properties of Specimens Obtained by Dual Polymerization: Radically Polymerization Followed by Amine Thermal Cured Radical polymerization of the acrylic-blocked polyurethane prepolymer/amine curing-agent mixture is accomplished by exposing the resin/amine mixture to UV light supplied by a UV-lamp which is turned on at at least 10 min before use to reach full brilliance. The procedure for the dual and sequential polymerization is as follows. The resin of example 2 was mixed with 0.5 wt. % of photoinitiator (PPO, 0.125 g). The resin and initiator were mixed in a high speed mixer (2000 rpm) for 40 seconds. A polyethylene mold 5"x5"x⅛" was coated with a release agent and 25 g of polymerizable material which was prepared by mixing equivalent amounts of the resin (resin of example 2 and PPO) and the amine curing agent. The mold was placed on a level surface with an adjustable platform to bring the polymerizable material in the mold close to the UV lamp. Irradiation of the plaques was continued until the surface was fully cured as determined by touching the different part of the polymerizing mass with a wooden tongue suppressor and the surface was tack free indicating photopolymerization completion. The molds were then placed into an oven preheated to 125° C. for 2 to 4 hours. After thermal curing, the plaques were easily removed from the mold using a metal tab. The plaques must remain in the mold during the thermal curing process otherwise the specimens will warp during this process. Physical testing of the dual cured plaques was performed using the standard ASTM D638 test. This test was used to compare the performance of various amines when thermally curing the radically polymerized resin from the previous step described above. The test measures the modulus, tensile strength, and percent elongation at break, and the figures with the bar diagrams below show the results for the various amines.

FIGS. 1 and 2 show the values for the tensile strength and elongation at break for various specimens made according to the dual polymerization process described above using amine curatives having different degrees of steric hindrance on their vicinal carbons. It can be seen that acceptable values were obtained in all cases. In particular, increasing the steric hindrance on the vicinal carbons improves the tensile strength when using 4,4'-methylene-bis(2,6-dimethylcyclohexylamine) instead of other more conventional amines such as 4,4'-methylene-bis(cyclohexylamine) and 4,4'-methylene-bis(2-methylcyclohexylamine) (curing agents 1 and 2 respectively in FIGS. 1 and 2).

Example 7

Synthesis of Curing Agents Made by Blocking Primary Amines with α,β-Unsaturated Esters Another aliphatic curing agent was prepared from ethyl acrylate and PACM. Ethyl acrylate (EA, 103.6 g, 1.035 mol, 2.10 equiv) was slowly added to PACM (103.71 g, 0.4930 mol) in THF. A slight reaction exotherm was observed upon EA addition. Mono-substituted PACM and di-substituted EA blocked PACM products were identified by GC-MS analysis of the product mixture.

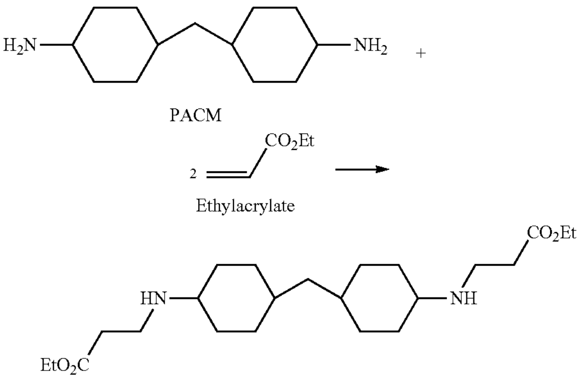
PACM
Ethylacrylate
2:1 Ethylacrylate:PACM Adduct

Similar curing agents were also prepared from PACM and diethylmaleate (DEM) to give 1,1',4,4'-tetraethyl N,N'-(methylenedi-4,1-cyclohexanediyl)bis(aspartate) by contacting a stoichiometric amount of these reagents in ethanol or THF typically in a DEM:PACM molar ratio of 2:1.

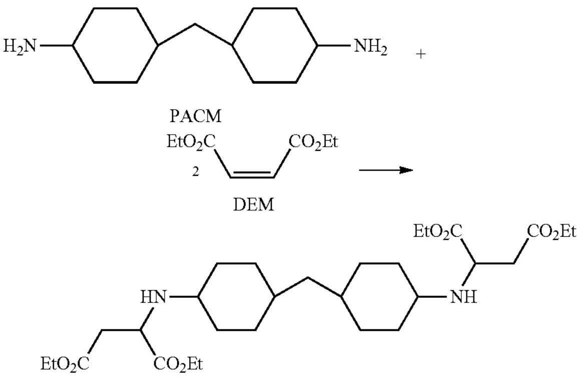
PACM
DEM

Example 8 (Prophetic)

Another aliphatic curing agent is prepared from ethylacrylate and 4-methylcyclohexane-1,3-diamine (MCHD).

Ethyl acrylate (EA, 103.6 g, 1.035 mol, 2.10 equiv) is slowly added to 4-methylcyclohexane-1,3-diamine (63.1 g, 0.4930 mol) in THF. A slight reaction exotherm is observed upon EA addition. Mono-substituted blocked MCHD and di-substituted EA blocked MCHD products are identified by GC-MS analysis of the product mixture.

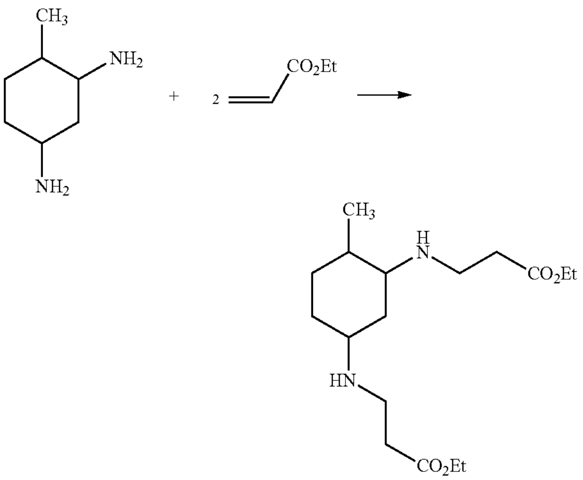

Similar curing agents are also prepared from 4-methylcyclohexane-1,3-diamine and diethylmaleate to give the corresponding diamine-diethylmaleate adduct by contacting a stoichiometric amount of these reagents in ethanol or THF typically in a DEM: MCHD molar ratio of 2:1.

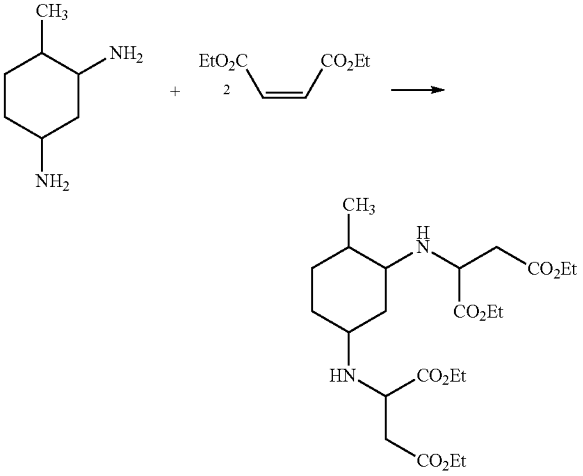

Example 9 (Prophetic)

TABLE II

Time Required for Viscocity to Double From Initial Value for Curing Agents Made by Amine Blocking with Acrylates and Maleates

| Curing Agent | $\eta_i$ (cP) | $\eta_f$ (cP) | Time (hours) |
|---|---|---|---|
| PACM:EA blocked molar ratio 1:1 respectively | 1000 | 2000 | ~26 |
| PACM:EA blocked molar ratio 1:2 respectively | 1000 | 2000 | >26 |
| PACM:DEM blocked molar ratio 1:1 respectively | 1000 | 2000 | >26 |
| PACM:DEM blocked molar ratio 1:2 respectively | 1000 | 2000 | 60-80 |
| 1,1',4,4'-Tetraethyl N,N'-(methylenedi-4,1-cyclohexanediyl)bis(aspartate) | 1000 | 2000 | 60-80 |
| MCDA:EA blocked molar ratio 1:1 respectively | 1000 | 2000 | ~26 |
| MCDA:EA blocked molar ratio 1:2 respectively | 1000 | 2000 | ~26 |
| MCDA:DEM blocked molar ratio 1:1 respectively | 1000 | 2000 | 60-80 |
| MCDA:DEM blocked molar ratio 1:2 respectively | 1000 | 2000 | 60-80 |

Specimens for physical property evaluations are made as in example 5 and they also show improvement in physical properties including tensile strength and elongation at break.

What is claimed is:

1. A method for preparing an object by a 3D printing process based on dual polymerization, wherein the 3D printing process based on dual polymerization comprises the following steps: (1) a Part A photopolymerizable component of a resin is polymerized first by a light induced process to form an intermediate object, (2) the intermediate object is then further cured by a Part B polymerizable component of a resin comprising an amine composition, wherein the amine composition comprises at least one amine curing agent with the structure:

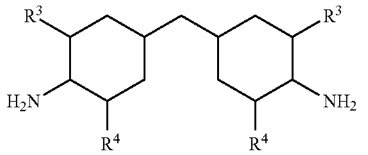

(II)

where $R^3$ is H and $R^4$ is a $C_{2-6}$ saturated alkyl linear or branched or where $R^3$=$R^4$=$C_{1-6}$ saturated alkyl linear or branched, and wherein the at least one amine curing agent is selected from the group consisting of 4,4'-methylenebis(2-ethylcyclohexylamine), 4,4'-methylenebis(2-(n -propyl) cyclohexylamine), 4,4'-methylenebis(2-(sec-propyl) cyclohexylamine), 4,4'-methylenebis(2-(n-butyl)cyclohexylamine), 4,4'-methylenebis(2-(sec-butyl)cyclohexylamine), 4,4'-methylenebis(2-(iso-butyl)cyclohexylamine), 4,4'-methylenebis(2-(t-butyl)cyclohexylamine), 4,4'-methylenebis(2-(n-pentyl)cyclohexylamine), 4,4'-methylenebis(2-(tert -pentyl)cyclohexylamine), 4,4'-methylenebis(2-(neo-pentyl)cyclohexylamine), 4,4'-methylenebis(2-(iso-pentyl)cyclohexylamine), 4,4'-methylenebis(2-(sec-pentyl)cyclohexylamine), 4,4'-methylenebis(2-(3-pentyl)cyclohexylamine), 4,4'-methylenebis(2-(sec -isopentyl)cyclohexylamine), 4,4'-methylenebis(2-(n-hexyl)cyclohexylamine), 4,4'-methylenebis(2-(2-hexyl)cyclohexylamine), 4,4'-methylenebis(2-(3-hexyl)cyclohexylamine), 4,4'-methylenebis(2-(neo-hexyl)cyclohexylamine), 4,4'- methylenebis(2-(isohexyl)cyclohexylamine), 4,4'-methylenebis(2-(4-methylpent-1-yl)cyclohexylamine), 4,4'-methylenebis(2-(4-methylpent-2-yl)cyclohexylamine), 4,4'-methylenebis(2-(2-methylpent-2-yl)cyclohexylamine), 4,4'-methylenebis(2-(2-methylpent-1-yl)cyclohexylamine), 4,4'-methylenebis(2,6-dimethylcyclohexylamine), 4,4'-methylenebis(2,6-diethylcyclohexylamine), 4,4'-methylenebis(2,6-di(n-propyl)cyclohexylamine), 4,4'-methylenebis(2,6-di(sec -propyl)cyclohexylamine), 4,4'-methylenebis(2,6-di(n-butyl)cyclohexylamine), 4,4'-methylenebis(2,6-di(sec-butyl)cyclohexylamine), 4,4'-methylenebis(2,6-di(iso -butyl)cyclohexylamine), 4,4'-methylenebis(2,6-di(t-butyl)cyclohexylamine), 4,4'-methylenebis(2,6-di(n-pentyl)cyclohexylamine), 4,4'-methylenebis(2,6-di(tert -pentyl)cyclohexylamine), 4,4'-methylenebis(2,6-di(neo-pentyl)cyclohexylamine), 4,4'-methylenebis(2,6-di(iso-pentyl)cyclohexylamine), 4,4'-methylenebis(2,6-di(sec -pentyl)cyclohexylamine), 4,4'-methylenebis(2,6-di(3-pentyl)cyclohexylamine), 4,4'-methylenebis(2,6-di(sec-isopentyl)cyclohexylamine), 4,4'-methylenebis(2,6-di(n -hexyl)cyclohexylamine), 4,4'-methylenebis(2,6-di(2-hexyl)cyclohexylamine), 4,4'-methylenebis(2,6-di(3-hexyl)cyclohexylamine), 4,4'-methylenebis(2,6-di(neo -hexyl)cyclohexylamine), 4,4'-methylenebis(2,6-di(isohexyl)cyclohexylamine), 4,4'-methylenebis(2,6-di(4-methylpent-1-yl)cyclohexylamine), 4,4'-methylenebis(2,6-di(4-methylpent -2-yl)cyclohexylamine), 4,4'-methylenebis(2,6-di(2-methylpent-2-yl)cyclohexylamine), and 4,4'-methylenebis(2,6-di(2-methylpent-1-yl) cyclohexylamine).

2. A method for preparing an object by a 3D printing process based on dual polymerization, wherein the 3D printing process based on dual polymerization comprises the following steps: (1) a Part A photopolymerizable component of a resin is polymerized first by a light induced process to form an intermediate object, (2) the intermediate object is then further cured by a Part B polymerizable component of a resin comprising an amine composition, wherein the amine composition comprises at least one amine curing agent with the structure:

(I)

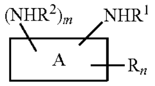

where R is H or a $C_{1-3}$ linear or branched alkyl; where A represents a $C_{6-20}$ cyclic, polycyclic or acyclic linear or branched polyamine; where $R^1$ and $R^2$ are a $C_{1-9}$ linear or branched alkyl substituent, a cyclic substituent having a heteroatom, or an aromatic substituent; and where n=1 to 6 and where m=1 to 3.

3. The method of claim 2 wherein the at least one amine curing agent is selected from the group consisting of N,N'-dialkylated 4,4-diaminodicyclohexylmethane, N,N'-dialkylated isophoronediamine, N,N'-dialkylated 4,4'-methylenebis(2-methylcyclohexylamine), N,N'-dialkylated 4-methylcyclohexane-1,3-diamine, N,N'-dialkylated ethylenediamine, N, N'-dialkylated propylene diamine, N,N'-dialkylated 1,4-butanediamine, N,N'-dialkylated 1,5-pentanediamine, N,N'-dialkylated 1,6-hexanediamine, N,N'-dialkylated 4-(aminomethyl) octane -1,8-diamine, N,N'-dialkylated 1,8-octyldiamine, N,N',N"-trialkylated 4-(aminomethyl) octane-1,8-diamine, N, N', N"-triialkylated tris(2-aminoethyl)amine, tris(3-aminopropyl)amine, and mixtures thereof; wherein the alkyl group is selected from the group consisting of methyl, ethyl, propyl, isopropyl, butyl, sec-butyl, isobutyl, pentyl, neopentyl, isopentyl, sec-pentyl, sec-isopentyl, 4-methylpent-2-yl and 2,2,6,6-tetramethylpiperidine-4yl.

4. A method for preparing an object by a 3D printing process based on dual polymerization, wherein the 3D printing process based on dual polymerization comprises the following steps: (1) a Part A photopolymerizable component of a resin is polymerized first by a light induced process to form an intermediate object, (2) the intermediate object is then further cured by a Part B polymerizable component of a resin comprising an amine composition, wherein the amine composition comprises the reaction product of i) at least one amine curing agent with the structure:

(III)

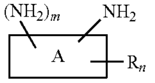

where R is H or a $C_{1-6}$ linear or branched alkyl, where A represents a $C_{6-20}$ cyclic, polycyclic or acyclic linear or branched polyamine, where n=1 to 6 and where m=1 to 3, with ii) at least one a,b-unsaturated carboxylic ester.

5. The method of claim 4 wherein the amine composition comprises the reaction product of i) 4,4-diaminodicyclohexylmethane or 4,4'-methylenebis(2-methylcyclohexylamine or 4,4'-methylenebis(2-ethylcyclohexylamine), or 4,4'-methylenebis(2-(n -propyl)cyclohexylamine), or 4,4'-methylenebis(2-(sec-propyl)cyclohexylamine), or 4,4'-methylenebis(2-(n-butyl)cyclohexylamine), or 4,4'-methylenebis(2-(sec-butyl)cyclohexylamine), or 4,4'-methylenebis(2-(iso-butyl)cyclohexylamine), or 4,4'-methylenebis(2-(t -butyl) cyclohexylamine), or 4,4'-methylenebis(2-(n-pentyl) cyclohexylamine), or 4,4'-methylenebis(2-(tert-pentyl) cyclohexylamine), or 4,4'-methylenebis(2-(neo -pentyl) cyclohexylamine), or 4,4'-methylenebis(2-(iso-pentyl) cyclohexylamine), or 4,4'-methylenebis(2-(sec-pentyl) cyclohexylamine), or 4,4'-methylenebis(2-(3-pentyl) cyclohexylamine), or 4,4'-methylenebis(2-(sec-isopentyl) cyclohexylamine), or 4,4'-methylenebis(2-(n-hexyl) cyclohexylamine), or 4,4'-methylenebis(2-(2-hexyl) cyclohexylamine), or 4,4'-methylenebis(2-(3-hexyl) cyclohexylamine), or 4,4'-methylenebis(2-(neo -hexyl) cyclohexylamine), or 4,4'-methylenebis(2-(isohexyl) cyclohexylamine), or 4,4'-methylenebis(2-(4-methylpent-1-yl)cyclohexylamine), or 4,4'-methylenebis(2-(4-methylpent-2-yl)cyclohexylamine), or 4,4'-methylenebis(2-(2-methylpent-2-yl)cyclohexylamine), or 4,4'-methylenebis (2-(2-methylpent-1-yl)cyclohexylamine), or 4,4'-methylenebis(2,6-dimethylcyclohexylamine), or 4,4'-methylenebis(2,6-diethylcyclohexylamine), or 4,4'-methylenebis(2,6-di(n-propyl)cyclohexylamine), or 4,4'-methylenebis(2,6-di(sec -propyl)cyclohexylamine), or 4,4'-methylenebis(2,6-di(n-butyl)cyclohexylamine), or 4,4'-methylenebis(2,6-di(sec-butyl)cyclohexylamine), or 4,4'-methylenebis(2,6-di(iso -butyl)cyclohexylamine), or 4,4'-methylenebis(2,6-di(t-butyl)cyclohexylamine), or 4,4'-methylenebis(2,6-di(n-pentyl)cyclohexylamine), or 4,4'-methylenebis(2,6-di(tert -pentyl)cyclohexylamine), or 4,4'-methylenebis(2,6-di(neo-pentyl)cyclohexylamine), or 4,4'-methylenebis(2,6-di(iso-pentyl)cyclohexylamine), or 4,4'-methylenebis(2,6-di(sec -pentyl)cyclohexylamine), or 4,4'-methylenebis(2,6-di(3-pentyl)cyclohexylamine), or 4,4'- methylenebis(2,6-di(sec-isopentyl)cyclohexylamine), or 4,4'-methylenebis(2,6-di(n -4,4'-methylenebis(2,6-di(2-hexyl)cyclohexylamine), or methylenebis(2,6-di(3-hexyl) cyclohexylamine), 4,4'-methylenebis(2,6-di(neo -hexyl)cyclohexylamine), or 4,4'-hexyl)cyclohexylamine), or 4,4'-methylenebis(2,6-di(isohexyl)cyclohexylamine), or 4,4'-methylenebis(2,6-di(4-methylpent-1-yl)cyclohexylamine), or 4,4'-methylenebis(2,6-di(4-methylpent-2-yl)cyclohexylamine), or 4,4'-methylenebis(2,6-di(2-methylpent-2-yl) cyclohexylamine), or 4,4'-methylenebis(2,6-di(2-methylpent-1-yl)cyclohexylamine or 4-methylcyclohexane-1,3-diamine (MCHD) or ethylenediamine (EDA) or propylene diamine (PDA) or 1,4-butanediamine (BDA), or 1,5-pentanediamine (PeDA) or 1,6-hexanediamine (HMDA) or 4-(aminomethyl)octane-1,8-diamine, or 1,8-octyldiamine or any mixture thereof with ii) methylacrylate, ethylacrylate, propylacrylate, butylacrylate, pentylacrylate, hexylacrylate, dimethylmaleate, diethylmaleate, dipropylmaleate, dibutylmaleate, dipentylmaleate, dihexylmaleate dimethylfumarate, diethylfumarate, dipropylfumarate, dibutylfumarate, dipentylfumarate, dihexylfumarate or any mixture thereof.

6. A method of forming a three-dimensional object comprising the following steps: a) getting in contact in an optically transparent build surface a polymerizable liquid in the presence of at least one of a reactive diluent, photoinitiator, and chain extender, wherein the polymerizable liquid comprises at least one of i) a monomer, ii) a blocked or reactive blocked oligomer or iii) a blocked or reactive blocked prepolymer; b) irradiating the build surface with light that passes through a radiation-transparent window to form a solid scaffold object; c) heating or microwaving the solid scaffold object to induce the polymerization of the at least one of a monomer, a blocked or reactive blocked oligomer or a blocked or reactive blocked prepolymer with an amine composition to form the three-dimensional object, wherein the amine composition comprises at least one amine curing agent with the structure:

(II)

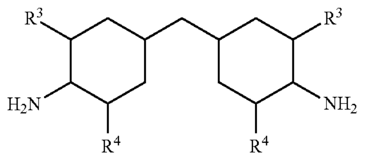

where $R^3$ is H and $R^4$ is $C_{2-6}$ saturated alkyl linear or branched or where $R^3$=$R^4$=$C_{1-6}$ saturated alkyl linear or branched, wherein the at least one amine curing agent is selected from the group consisting 4,4'-methylenebis(2-ethylcyclohexylamine), 4,4'-methylenebis(2-(n -propyl)cyclohexylamine), 4,4'-methylenebis(2-(sec-propyl)cyclohexylamine), 4,4'-methylenebis(2-(n-butyl)cyclohexylamine), 4,4'-methylenebis(2-(sec-butyl)cyclohexylamine), 4,4'-methylenebis(2-(iso-butyl)cyclohexylamine), 4,4'-methylenebis(2-(t-butyl)cyclohexylamine), 4,4'-methylenebis(2-(n-pentyl)cyclohexylamine), 4,4'-methylenebis(2-(tert -pentyl)cyclohexylamine), 4,4'-methylenebis(2-(neo-pentyl) cyclohexylamine), 4,4'-methylenebis(2-(iso-pentyl)cyclohexylamine), 4,4'-methylenebis(2-(sec-pentyl)cyclohexylamine), 4,4'-methylenebis(2-(3-pentyl)cyclohexylamine), 4,4'-methylenebis(2-(sec -isopentyl)cyclohexylamine), 4,4'-methylenebis(2-(n-hexyl)cyclohexylamine), 4,4'-methylenebis(2-(2-hexyl)cyclohexylamine), 4,4'-methylenebis(2-(3-hexyl) cyclohexylamine), 4,4'-methylenebis(2-(neo-hexyl) cyclohexylamine), 4,4'-methylenebis(2-(isohexyl) cyclohexylamine), 4,4'-methylenebis(2-(4-methylpent-1-yl) cyclohexylamine), 4,4'-methylenebis(2-(4-methylpent-2-yl) cyclohexylamine), 4,4'-methylenebis(2-(2-methylpent-2-yl) cyclohexylamine), 4,4'-methylenebis(2-(2-methylpent-1-yl) cyclohexylamine), 4,4'-methylenebis(2,6-dimethylcyclohexylamine), 4,4'-methylenebis(2,6-diethylcyclohexylamine), 4,4'-methylenebis(2,6-di(n-propyl)cyclohexylamine), 4,4'-methylenebis(2,6-di(sec -propyl)cyclohexylamine), 4,4'-methylenebis(2,6-di(n-butyl)cyclohexylamine), 4,4'-methylenebis(2,6-di(sec-butyl)cyclohexylamine), 4,4'-methylenebis(2,6-di(iso -butyl)cyclohexylamine), 4,4'-methylenebis(2,6-di(t-butyl)cyclohexylamine), 4,4'-methylenebis(2,6-di(n-pentyl)cyclohexylamine), 4,4'-methylenebis(2,6-di(tert -pentyl)cyclohexylamine), 4,4'-methylenebis(2,6-di(neo-pentyl)cyclohexylamine), 4,4'-methylenebis(2,6-di(iso-pentyl)cyclohexylamine), 4,4'-methylenebis(2,6-di(sec -pentyl)cyclohexylamine), 4,4'-methylenebis(2,6-di(3-pentyl)cyclohexylamine), 4,4'-methylenebis(2,6-di(sec-isopentyl)cyclohexylamine), 4,4'-methylenebis(2,6-di(n -hexyl)cyclohexylamine), 4,4'-methylenebis(2,6-di(2-hexyl)cyclohexylamine), 4,4'-methylenebis(2,6-di(3-hexyl)cyclohexylamine), 4,4'-methylenebis(2,6-di(neo -hexyl)cyclohexylamine), 4,4'-methylenebis(2,6-di(isohexyl)cyclohexylamine), 4,4'-methylenebis(2,6-di(4-methylpent-1-yl)cyclohexylamine), 4,4'-methylenebis(2,6-di(4-methylpent -2-yl)cyclohexylamine), 4,4'-methylenebis(2,6-di(2-methylpent-2-yl)cyclohexylamine), and 4,4'-methylenebis(2,6-di(2-methylpent-1-yl) cyclohexylamine).

7. A method of forming a three-dimensional object comprising the following steps: a) getting in contact in an optically transparent build surface a polymerizable liquid in the presence of at least one of a reactive diluent, photoinitiator, and chain extender, wherein the polymerizable liquid comprises at least one of i) a monomer, ii) a blocked or reactive blocked oligomer or iii) a blocked or reactive blocked prepolymer; b) irradiating the build surface with light that passes through a radiation-transparent window to form a solid scaffold object; c) heating or microwaving the solid scaffold object to induce the polymerization of the at least one of a monomer, a blocked or reactive blocked oligomer or a blocked or reactive blocked prepolymer with an amine composition to form the three- dimensional object, wherein the amine composition comprises at least one amine curing agent with the structure:

(I)

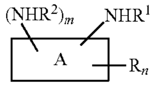

where R is H or a $C_{1-3}$ linear or branched alkyl; where A represents a $C_{6-20}$ cyclic, polycyclic or acyclic linear or branched polyamine; where $R^1$ and $R^2$ are a $C_{1-9}$ linear or branched alkyl substituent, a cyclic substituent having a heteroatom, or an aromatic substituent; and where n=1 to 6 and where m=1 to 3.

8. The method of claim 7 wherein the at least one amine curing agent is selected from the group consisting of N,N'-dialkylated 4,4-diaminodicyclohexylmethane, N,N'-dialkylated isophoronediamine, N,N'-dialkylated 4,4'-methylenebis(2-methylcyclohexylamine), N,N'-dialkylated 4-methylcyclohexane-1,3-diamine, N,N'-dialkylated ethylenediamine, N,N'-dialkylated propylene diamine, N,N'-dialkylated 1,4-butanediamine, N,N'-dialkylated 1,5-pentanediamine, N,N'-dialkylated 1,6-hexanediamine, N,N'-dialkylated 4-(aminomethyl) octane-1,8-diamine, N,N'-dialkylated 1,8-octyldiamine, N,N',N"-trialkylated 4-(aminomethyl)octane-1,8-diamine, N,N',N"-triialkylated tris(2-aminoethyl)amine, tris(3-aminopropyl)amine, and mixtures thereof; wherein the alkyl group is selected from the group consisting of methyl, ethyl, propyl, isopropyl, butyl, sec-butyl, isobutyl, pentyl, neopentyl, isopentyl, sec-pentyl, sec-isopentyl, 4-methylpent-2-yl and 2,2,6,6-tetramethylpiperidine-4yl.

9. A method of forming a three-dimensional object comprising the following steps: a) getting in contact in an optically transparent build surface a polymerizable liquid in the presence of at least one of a reactive diluent, photoinitiator, and chain extender, wherein the polymerizable liquid comprises at least one of i) a monomer, ii) a blocked or reactive blocked oligomer or iii) a blocked or reactive blocked prepolymer; b) irradiating the build surface with light that passes through a radiation-transparent window to form a solid scaffold object; c) heating or microwaving the solid scaffold object to induce the polymerization of the at least one of a monomer, a blocked or reactive blocked oligomer or a blocked or reactive blocked prepolymer with an amine composition to form the three-dimensional object, wherein the amine composition comprises the reaction product of i) at least one amine curing agent with the structure:

(III)

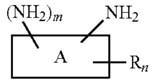

where R is H or a $C_{1-6}$ linear or branched alkyl, where A represents a $C_{6-20}$ cyclic, polycyclic or acyclic linear or branched polyamine, where n=1 to 6 and where m=1 to 3, with ii) at least one a,b-unsaturated carboxylic ester.

10. The method of claim 9 wherein the amine composition comprises the reaction product of i) 4,4-diaminodicyclohexylmethane or 4,4'-methylenebis(2-methylcyclohexylamine or 4,4'-methylenebis(2-ethylcyclohexylamine), or 4,4'-methylenebis(2-(n-propyl)cyclohexylamine), or 4,4'-methylenebis(2-(sec-propyl)cyclohexylamine), or 4,4'-methylenebis(2-(n -butyl)cyclohexylamine), or 4,4'-methylenebis(2-(sec-butyl)cyclohexylamine), or 4,4'-methylenebis(2-(iso-butyl)cyclohexylamine), or 4,4'-methylenebis(2-(t-butyl) cyclohexylamine), or 4,4'-methylenebis(2-(n-pentyl) cyclohexylamine), or 4,4'-methylenebis(2-(tert -pentyl) cyclohexylamine), or 4,4'-methylenebis(2-(neo-pentyl) cyclohexylamine), or 4,4'-methylenebis(2-(iso-pentyl) cyclohexylamine), or 4,4'-methylenebis(2-(sec -pentyl) cyclohexylamine), or 4,4'-methylenebis(2-(3-pentyl) cyclohexylamine), or 4,4'-methylenebis(2-(sec-isopentyl) cyclohexylamine), or 4,4'-methylenebis(2-(n -hexyl) cyclohexylamine), or 4,4'-methylenebis(2-(2-hexyl) cyclohexylamine), or 4,4'-methylenebis(2-(3-hexyl) cyclohexylamine), or 4,4'-methylenebis(2-(neo-hexyl) cyclohexylamine), or 4,4'-methylenebis(2-(isohexyl) cyclohexylamine), or 4,4'-methylenebis(2-(4-methylpent-1-yl)cyclohexylamine), or 4,4'-methylenebis(2-(4-methylpent-2-yl)cyclohexylamine), or 4,4'-methylenebis(2-(2-methylpent-2-yl)cyclohexylamine), or 4,4'-methylenebis (2-(2-methylpent-1-yl)cyclohexylamine), or 4,4'-methylenebis(2,6-dimethylcyclohexylamine), or 4,4'-methylenebis(2,6-diethylcyclohexylamine), or 4,4'-methylenebis(2,6-di(n -propyl)cyclohexylamine), or 4,4'-methylenebis(2,6-di(sec-propyl)cyclohexylamine), or 4,4'-methylenebis(2,6-di(n-butyl)cyclohexylamine), or 4,4'-methylenebis(2,6-di(sec -butyl)cyclohexylamine), or 4,4'-methylenebis(2,6-di(iso-butyl)cyclohexylamine), or 4,4'-methylenebis(2,6-di(t-butyl)cyclohexylamine), or 4,4'-methylenebis(2,6-di(n -pentyl)cyclohexylamine), or 4,4'-methylenebis(2,6-di(tert-pentyl)cyclohexylamine), or 4,4'-methylenebis(2,6-di(neo-pentyl)cyclohexylamine), or 4,4'-methylenebis(2,6-di(iso -pentyl)cyclohexylamine), or 4,4'-methylenebis(2,6-di(sec-pentyl)cyclohexylamine), or 4,4'-methylenebis(2,6-di(3-pentyl)cyclohexylamine), or 4,4'-methylenebis(2,6-di(sec -isopentyl)cyclohexylamine), or 4,4'-methylenebis(2,6-di(n-hexyl)cyclohexylamine), or 4,4'-methylenebis(2,6-di(2-hexyl)cyclohexylamine), or 4,4'-methylenebis(2,6-di(3-hexyl)cyclohexylamine), or 4,4'-methylenebis(2,6-di(neo-hexyl)cyclohexylamine), or 4,4'-methylenebis(2,6-di(isohexyl)cyclohexylamine), or 4,4'-methylenebis(2,6-di(4-methylpent-1-yl)cyclohexylamine), or 4,4'-methylenebis(2,6-di(4-methylpent-2-yl)cyclohexylamine), or 4,4'-methylenebis(2,6-di(2-methylpent-2-yl) cyclohexylamine), or 4,4'-methylenebis(2,6-di(2-methylpent-1-yl)cyclohexylamine or 4-methylcyclohexane-1,3-diamine (MCHD) or ethylenediamine (EDA) or propylene diamine (PDA) or 1,4-butanediamine (BDA), or 1,5-pentanediamine (PeDA) or 1,6-hexanediamine (HMDA) or 4-(aminomethyl) octane-1,8-diamine, or 1,8-octyldiamine or any mixture thereof with ii) methylacrylate, ethylacrylate, propylacrylate, butylacrylate, pentylacrylate, hexylacrylate, dimethylmaleate, diethylmaleate, dipropylmaleate, dibutylmaleate, dipentylmaleate, dihexylmaleate dimethylfumarate, diethylfumarate, dipropylfumarate, dibutylfumarate, dipentylfumarate, dihexylfumarate or any mixture thereof.

11. The method of claim 6 wherein the blocked or reactive blocked prepolymer comprises at least one of a diisocyanate prepolymer, a polyisocyanate prepolymer, and a polyisocyanate oligomer.

12. The method of claim 11 wherein the blocked or reactive blocked prepolymer comprises a diisocyanate prepolymer or polyisocyanate prepolymer made by the condensation of an isocyanate or polyisocyanate with a polyol or a polyamine or a combination of both to make a polyurethane or a polyurea on a polyurethane/polyurea prepolymer that is terminated with isocyanate functionality.

13. The method of claim 11 wherein the blocked or reactive blocked prepolymer comprises a polyisocyanate oligomer produced by the reaction of at least one diisocyanate with at least one polyol.

14. The method of claim 11 wherein the reactive blocked prepolymer is blocked by reaction of a polyisocyanate with a blocking agent selected from the group consisting of 2-(tert -butylamino)ethyl methacrylate, 2-(tert-pentylamino) ethyl methacrylate, 2-(tert -hexylamino)ethylmethacrylate, 3-(tert-butylamino)propyl methacrylate, and mixtures thereof.

15. The method of claim 11 wherein the diisocyanate prepolymer, polyisocyanate prepolymer, or polyisocyanate oligomer is blocked with 2-formyloxyethyl(meth)acrylate.

16. The method of claim 6 wherein the reactive diluent comprises an acrylate, a methacrylate, a styrene, an acrylic acid, a vinylamide, a vinyl ether, a vinyl ester, acrylonitrile, styrene, divinyl benzene, vinyl toluene, methyl acrylate, ethyl acrylate, butyl acrylate, methyl (meth)acrylate, amine (meth)acrylates as well as their derivatives and combinations thereof.

17. The method of claim 6 wherein the chain extender comprises at least diol, diamine or dithiol selected from the group consisting of ethylene glycol, 1,3-propanediol, 1,2- propanediol, 1,4-butanediol, 1.5-pentanediol, 1.6-hexanediol, 1.7-heptanediol, 1,8-octanediol, 1.9-nonanediol, 1,10-decanediol, 1,11-undecanediol, 1,12-dodecanediol, 1.2-cyclohexanedimethanol, 1,4-cyclohexanedimethanol; the corresponding diamine and dithiol analogs thereof; lysine ethyl ester, arginine ethyl ester, p-alanine-based diamine, and random or block copolymers made from at least one diisocyanate and at least one diol, diamine or dithiol.

18. The method of claim 6 wherein the photoinitiator is a benzoyl-chromophore based compound, a morpholine amino ketone, or a benzoyl phosphine oxide.

19. The method of claim 6 wherein the light is an ultraviolet light.

20. The method of claim 7 wherein the blocked or reactive blocked prepolymer comprises at least one of a diisocyanate prepolymer, a polyisocyanate prepolymer, and a polyisocyanate oligomer.

21. The method of claim 20 wherein the blocked or reactive blocked prepolymer comprises a diisocyanate prepolymer or polyisocyanate prepolymer made by the condensation of an isocyanate or polyisocyanate with a polyol or a polyamine or a combination of both to make a polyurethane or a polyurea on a polyurethane/polyurea prepolymer that is terminated with isocyanate functionality.

22. The method of claim 20 wherein the blocked or reactive blocked prepolymer comprises a polyisocyanate oligomer produced by the reaction of at least one diisocyanate with at least one polyol.

23. The method of claim 20 wherein the reactive blocked prepolymer is blocked by reaction of a polyisocyanate with a blocking agent selected from the group consisting of 2-(tert -butylamino)ethyl methacrylate, 2-(tert-pentylamino) ethyl methacrylate, 2-(tert -hexylamino)ethylmethacrylate, 3-(tert-butylamino)propyl methacrylate, and mixtures thereof.

24. The method of claim 20 wherein the diisocyanate prepolymer, polyisocyanate prepolymer, or polyisocyanate oligomer is blocked with 2-formyloxyethyl(meth)acrylate.

25. The method of claim 7 wherein the reactive diluent comprises an acrylate, a methacrylate, a styrene, an acrylic acid, a vinylamide, a vinyl ether, a vinyl ester, acrylonitrile, styrene, divinyl benzene, vinyl toluene, methyl acrylate, ethyl acrylate, butyl acrylate, methyl (meth)acrylate, amine (meth)acrylates as well as their derivatives and combinations thereof.

* * * * *